United States Patent
Ocko et al.

(10) Patent No.: US 8,469,801 B2
(45) Date of Patent: Jun. 25, 2013

(54) APPARATUSES, METHODS AND SYSTEMS FOR A MULTI-LEVEL IN-GAME CURRENCY PLATFORM

(75) Inventors: Matthew Ocko, San Francisco, CA (US); Sim Singh, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,692

(22) Filed: Sep. 26, 2011

(65) Prior Publication Data

US 2012/0015714 A1    Jan. 19, 2012

Related U.S. Application Data

(63) Continuation of application No. 12/895,738, filed on Sep. 30, 2010, now Pat. No. 8,210,934.

(60) Provisional application No. 61/247,549, filed on Sep. 30, 2009.

(51) Int. Cl.
*A63F 9/24* (2006.01)
*G06F 17/00* (2006.01)

(52) U.S. Cl.
USPC ........................................................... 463/25

(58) Field of Classification Search
USPC .......................................................... 463/25
See application file for complete search history.

(56) References Cited

U.S. PATENT DOCUMENTS

| | | | | |
|---|---|---|---|---|
| 2005/0251440 | A1* | 11/2005 | Bednarek | 705/10 |
| 2007/0087820 | A1* | 4/2007 | Van Luchene et al. | 463/25 |
| 2007/0233568 | A1* | 10/2007 | Pou et al. | 705/14 |
| 2008/0004116 | A1* | 1/2008 | Van Luchene et al. | 463/42 |
| 2009/0054149 | A1* | 2/2009 | Brosnan et al. | 463/42 |
| 2009/0170608 | A1* | 7/2009 | Herrmann et al. | 463/42 |

* cited by examiner

*Primary Examiner* — Dmitry Suhol
*Assistant Examiner* — Carl V Larsen
(74) *Attorney, Agent, or Firm* — Martine Penilla Group, LLP

(57) ABSTRACT

The APPARATUSES and METHODS FOR dynamic conversion of a transaction includes receiving a transaction request from a user, wherein the transaction request includes data related to a transaction and user characteristics of the user. The data associated with the transaction and the user is analyzed to determine if the user is eligible to request the transaction. When it is determined that the user is eligible for requesting the transaction, identifying a payment currency for the requested transaction, computing dynamic conversion rate for converting the payment currency to the requested virtual currency, and calculating a purchase price in terms of the payment currency for the requested virtual currency of the transaction request using the dynamic conversion rate, the purchase price is used in completing the transaction request.

20 Claims, 13 Drawing Sheets

APPARATUSES, METHODS AND SYSTEMS FOR A MULTI-LEVEL IN-GAME CURRENCY PLATFORM

CLAIM OF PRIORITY

This application claims priority as a continuation, under 35 USC §120, of U.S. patent application Ser. No. 12/895,738 entitled "APPARATUSES, METHODS AND SYSTEMS FOR A MULTI-LEVEL IN-GAME CURRENCY PLATFORM," filed on Sep. 30, 2010, which claims benefit, under 35 USC §119, of U.S. Provisional Patent Application No. 61/247,549, filed on Sep. 30, 2009, and entitled "MULTI-LEVEL IN-GAME CURRENCIES," which are hereby incorporated by reference.

CROSS REFERENCE TO RELATED APPLICATIONS

For additional teachings of various uses of social graphs, see U.S. provisional patent application Ser. No. 61/179,345 filed May 19, 2009, entitled "DIRECT EMBEDDING OF GAMES INTO THIRD PARTY WEBSITES," and U.S. patent application Ser. No. 12/778,956 filed May 12, 2010, entitled "EMBEDDING OF GAMES INTO THIRD PARTY WEBSITES."

The entire contents of the aforementioned applications are herein expressly incorporated by reference.

FIELD OF THE INVENTION

The present invention is directed generally to apparatuses, methods and systems of using multiple currencies in games, and more particularly, to APPARATUSES, METHODS AND SYSTEMS FOR A MULTI-LEVEL IN-GAME CURRENCY PLATFORM.

BACKGROUND

Various applications that allow users to interact with other users through the Internet have become popular. Online games that allow players to interact with other players are one type of such online applications. Some online games, such as chess or bridge, have a small number of players that play together at the same time. Other online games, such as massively multiplayer online games, can have a large number of users playing together at once. Many online games use in-game currencies that may be used as part of the game (e.g., betting currency in card games) or to purchase various in game items.

SUMMARY

The APPARATUSES, METHODS AND SYSTEMS FOR A MULTI-LEVEL IN-GAME CURRENCY PLATFORM (hereinafter "MIC") transform user transaction request input via various MIC components into transaction result output.

In one embodiment, a method for dynamic conversion of a transaction implemented by a processor is disclosed. The method includes receiving a transaction request from a user, wherein the transaction request includes data related to a transaction and user characteristics of the user. The transaction request is for crediting an account of the user with a specific virtual currency. The data associated with the transaction and the user is analyzed to determine if the user is eligible to request the transaction. When it is determined that the user is eligible for requesting the transaction, identifying a payment currency for the requested transaction, computing dynamic conversion rate for converting the payment currency to the requested virtual currency, and calculating a purchase price in terms of the payment currency for the requested virtual currency of the transaction request using the dynamic conversion rate. The purchase price is used in completing the transaction request.

In an alternate embodiment, a method for dynamic conversion of a transaction implemented by a processor is disclosed. The method includes receiving a request from a user to convert a payment virtual currency of a first type to a requested virtual currency of a second type. The request includes data related to a transaction and information associated with the user requesting the transaction. The request is for crediting a user's account with the requested virtual currency, wherein the payment virtual currency is a reward or transfer. The method further includes verifying to see if the user is eligible to receive the payment virtual currency as a reward or transfer. The user eligibility is based on type of transaction and pre-determined logic rules. Data associated with the transaction and the user is analyzed to determine if the payment virtual currency can be converted to requested virtual currency and if the user is eligible to convert the payment virtual currency to the requested virtual currency. Dynamic conversion rate for converting the payment virtual currency to the requested virtual currency is computed and a purchase price for the requested virtual currency of the request is calculated using the computed dynamic conversion rate in response to the request from the user.

In a further embodiment, a non-transitory processor-readable storage medium for storing instructions related to dynamic conversion of a transaction is disclosed. The storage medium includes instructions to receive a transaction request from a user, wherein the transaction request includes data related to a transaction and user characteristics of the user. The transaction request is for crediting an account of the user with a specific virtual currency. The instructions within the storage medium are further configured to analyze data associated with the transaction and the user to determine if the user is eligible to request the transaction. When it is determined that the user is eligible for requesting the transaction, the instructions within the storage medium are configured to identify a payment currency for the requested transaction, compute dynamic conversion rate for converting the payment currency to the requested virtual currency, and calculate a purchase price in terms of the payment currency for the requested virtual currency of the transaction request using the dynamic conversion rate. The computed purchase price is used in completing the transaction request.

BRIEF DESCRIPTION OF THE DRAWINGS

The accompanying appendices and/or drawings illustrate various non limiting, example, inventive aspects in accordance with the present disclosure.

Figure 1:
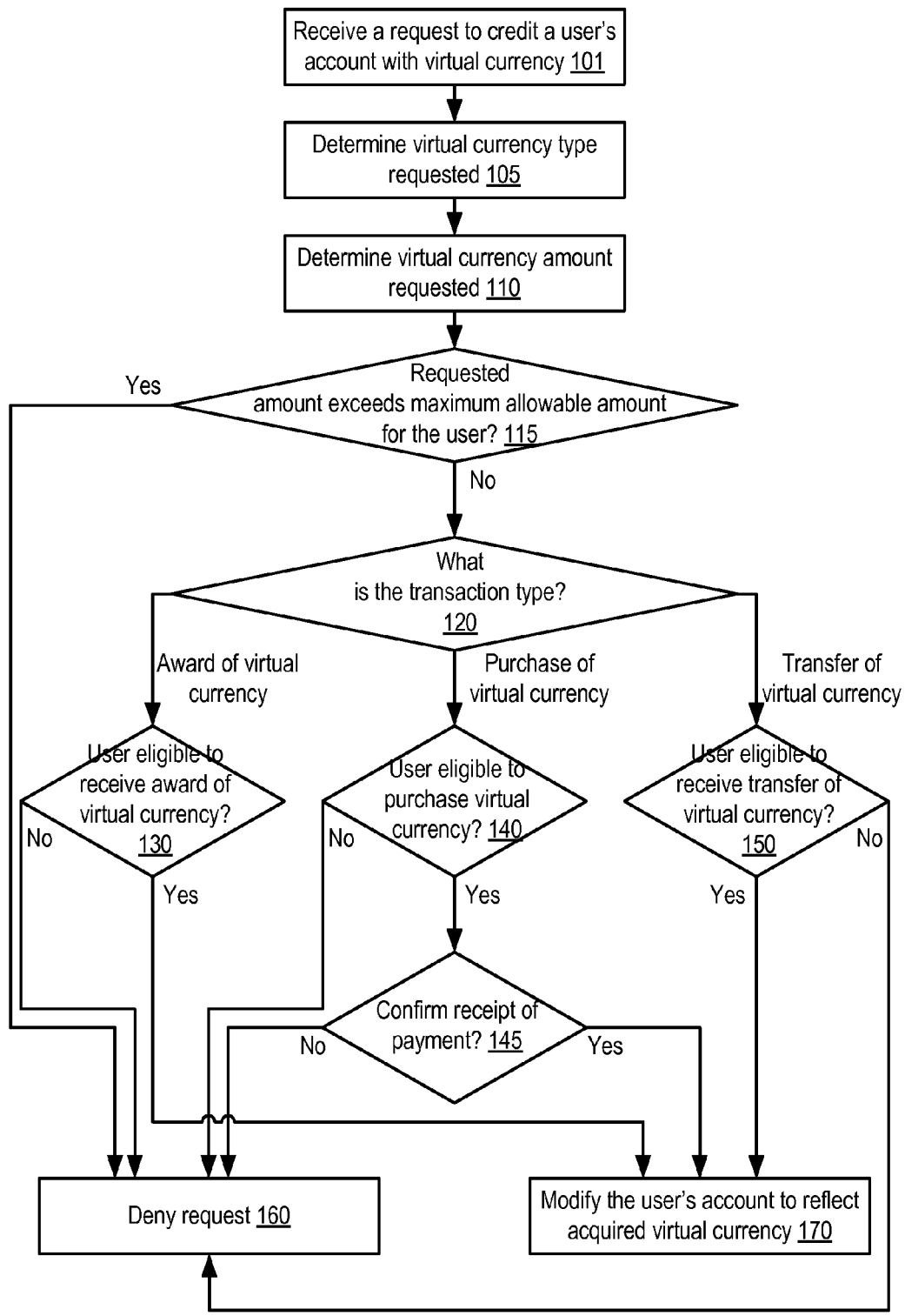
FIG. 1 is of a logic flow diagram illustrating transaction processing in one embodiment of the MIC platform.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Overview

Online game operators provide users an opportunity to play online games together with their friends. Particularly, social game operators harness online social networks, designing games that closely integrate the social graph data of users and their existing friendship connections. Different types of virtual currencies may be used by the game operators in various games. In one embodiment, a single virtual currency may exist that may be freely exchangeable. For example, in a simulated casino game, a player may exchange a $1,000,000 chip for ten $100,000 chips or for one hundred $10,000 chips. In another embodiment, multiple virtual currencies may exist, and they may not be freely interchangeable between each other. For example, some virtual currency types (e.g., New York Dollars, Cuban Pesos, and Moscow Rubles used in Zynga Game Networks Mafia Wars game) may not be exchanged between each other, while other virtual currency types may be exchanged in predetermined ways (e.g., Reward Points may be used to purchase New York Dollars, Cuban Pesos, and Moscow Rubles, but these currency types may not be used to purchase Reward Points). To encourage various behaviors (e.g., be more social, spend more money), online game operators may use social graph information associated with users to determine how users may use their real and/or virtual currency. For example, a user who invited many friends in the user's social graph to play a game may be rewarded with more favorable currency conversion rates and/or allowed to exchange between more currency types than a user who invited few friends in the user's social graph to play the game. In another example, a user who has helped a lot of friends play the game (e.g., sent many gifts) may be rewarded with special coins that facilitate access to exclusive items, abilities, areas, and/or the like.

In one embodiment, social graph information may describe a user's friends. For example, user Alice may be a friend of user Bob, implying that Alice and Bob are related in some way. In one implementation, the relationship can be explicit, such as a relationship stored in a social network database that links Alice's user record to Bob's user record (e.g., a relationship database table in the Social Graph table group 1319*b*). For example, Alice and Bob may be listed as friends in a social network database because one or both of them set up the explicit connection. In another implementation, the relationship may be implicit in that the MIC platform determines, based on data available to it (e.g., data regarding user stored in the User table group 1319*a*), that a relationship exists between Alice and Bob that can be deemed a friend relationship. For example, the MIC platform may include logic to track which users play together, note repeat linkings and infer a friend relationship. In one embodiment, determining friend relationships might involve a plurality of social graphs. For example, friends could be identified by relationships in a social graph set up by a company operating a social networking site and/or social graphs set up by an online game company. In one embodiment, social graphs can be multiple levels (e.g., there are friends of friends), and in some contexts, friends of friends are treated as friends (and that itself could be recursive). In one embodiment, social graphs may be unidirectional or bidirectional and different types of links may optionally be given different weights (e.g., explicit links may be given a weight of W, implicit links may be given a weight of W/2, and mutual links may be given a weight of 2W).

MIC

FIG. 1 is of a logic flow diagram illustrating transaction processing in one embodiment of the MIC platform. In one embodiment, a transaction may involve acquisition of virtual currency by a user. For example, a user may purchase virtual currency, receive virtual currency as a gift, and/or the like. For example, the user may acquire one type or multiple types of virtual currency in the transaction. In FIG. 1, a request to credit a user's account with virtual currency is received at 101. In one embodiment, transaction details may be included in a transaction details data structure included as part of the request. For example, the transaction details data structure may be passed in as an argument to a function written in the PHP programming language (e.g., the transaction details data structure may include a variety of fields such as the unique ID (UID) for a user involved in the transaction, type of virtual currency to be credited, amount of virtual currency to be credited, and/or the like).

Virtual currency type requested may be determined at 105, and virtual currency amount requested may be determined at 110. In one embodiment, these transaction details may be retrieved from the transaction details data structure using PHP (e.g., $VCType=$transactionDetails["VCType"]; $VCAmount=$transactionDetails["VCAmount"];). For example, a user may purchase virtual currency and the details of the transaction may be passed among MIC platform components using the transaction details data structure. In another embodiment, these transaction details may be retrieved from the In-Game Data table group 1319*c* using a SQL statement (e.g., SELECT VCType, VCAmount FROM PeriodicCurrency Awards WHERE UID='UID for a user from the transaction details data structure'). For example, a user may be awarded an amount of virtual currency (e.g., 100,000,000) of a virtual currency type (e.g., New York Dollars) on a periodic basis (e.g., per minute, hour, day, and/or the like) based on the user's progress in the game (e.g., the level of user's Mega Casino in Zynga Game Network's Mafia Wars game).

A determination may be made at 115, whether the requested amount of virtual currency exceeds the maximum allowable amount of virtual currency of the requested virtual currency type for a user. In one embodiment, the determination may be made based on data in the User table group 1319a and/or the In-Game Data table group 1319c. In one implementation, the user's current currency amount may be retrieved from the User table group 1319a using a SQL statement (e.g., SELECT VCAmount FROM User Currency Table WHERE user_UID='User's UID' AND VCType='VC Type requested'), the user's maximum allowable amount of virtual currency type may be retrieved from the In-Game Data table group 1319c using a SQL statement (e.g., SELECT VCAmountLimit FROM Currency LimitsTable WHERE user_UID='User's UID' AND VCType='VC Type requested'), and the two retrieved values may be compared to make the determination. In another implementation, the determination may be made based on game logic rules (e.g., the limit for a currency type may be a multiple of the user's in-game level).

In one embodiment, if the requested amount exceeds the maximum allowable amount, the request may be denied at 160. For example, if a user attempts to purchase more special Royalé poker chips than allowed given the user's level, the request may be denied. Preventing the user from purchasing an unlimited number of special Royalé poker chips may help limit game distortion. In another embodiment, if the requested amount exceeds the maximum allowable amount, the request may be allowed to proceed for certain predetermined types of transactions. For example, an energy boost from an Energy Pack game item may be allowed to exceed the maximum allowable amount of energy for the user, while the periodic accumulation of energy based on passage of time may not be allowed to exceed the maximum allowable amount of energy for the user.

If the determination at 115 is negative, the transaction type is determined at 120. In one embodiment, the transaction type may be an award of virtual currency, a purchase of virtual currency, a transfer of virtual currency, and/or the like. For example, an award of virtual currency may be based on passage of time, fulfillment of incentives, occurrence of events, and/or the like. For example, virtual currency may be purchased using real currency, credit virtual currency, special virtual currency, ordinary virtual currency, and/or the like. For example, virtual currency may be transferred by winning the virtual currency, receiving the virtual currency as a gift, and/or the like. In one implementation, the transaction type may be retrieved from the transaction details data structure using PHP (e.g., $TransactionType=$transactionDetails["TransactionType"];). For example, the transaction type may indicate that the transaction is an "award of virtual currency." In another example, the transaction type may indicate that the transaction is a "periodic energy award" and the MIC platform may determine that such a transaction is an "award of virtual currency" based on game logic rules.

If the transaction type is an award of virtual currency, user eligibility to receive the award of virtual currency may be determined at 130. In one embodiment, passage of time, fulfillment of incentives, occurrence of events, and/or the like may be checked to determine eligibility. See FIG. 3 for additional details regarding determining whether a user is eligible to receive an award of virtual currency.

If the transaction type is a purchase of virtual currency, user eligibility to purchase the virtual currency may be determined at 140. In one embodiment, in-game data, social graph data, and/or the like may be checked to determine purchase eligibility. See FIG. 6 for additional details regarding determining whether a user is eligible to purchase virtual currency. In one embodiment, if the user is eligible to purchase virtual currency, receipt of payment may be confirmed at 145. In one implementation, a third party payment processor may be used to handle payment, and a confirmation from the third party payment processor (e.g., using a callback URL that includes the UID of the transaction) may indicate that the payment was received.

If the transaction type is a transfer of virtual currency, user eligibility to transfer the virtual currency may be determined at 150. In one embodiment, in-game data, social graph data, and/or the like may be checked to determine transfer eligibility. See FIG. 10 for additional details regarding determining whether a user is eligible to receive a transfer of virtual currency.

If the user is ineligible to complete the transaction based on determination at 130, 140, 145, or 150, the request may be denied at 160. Otherwise, the user's account may be modified to reflect the acquisition of virtual currency at 170. For example, the amount of virtual currency of the acquired virtual currency type associated with the user's account may be increased. In another example, access to new upgrades, abilities, areas, and/or the like may be granted based on the acquisition (e.g., based on acquiring a predetermined minimum amount of virtual currency of a specified type). See FIG. 11 for additional details regarding modifying a user's account to reflect having newly acquired virtual currency.

Figure 2:
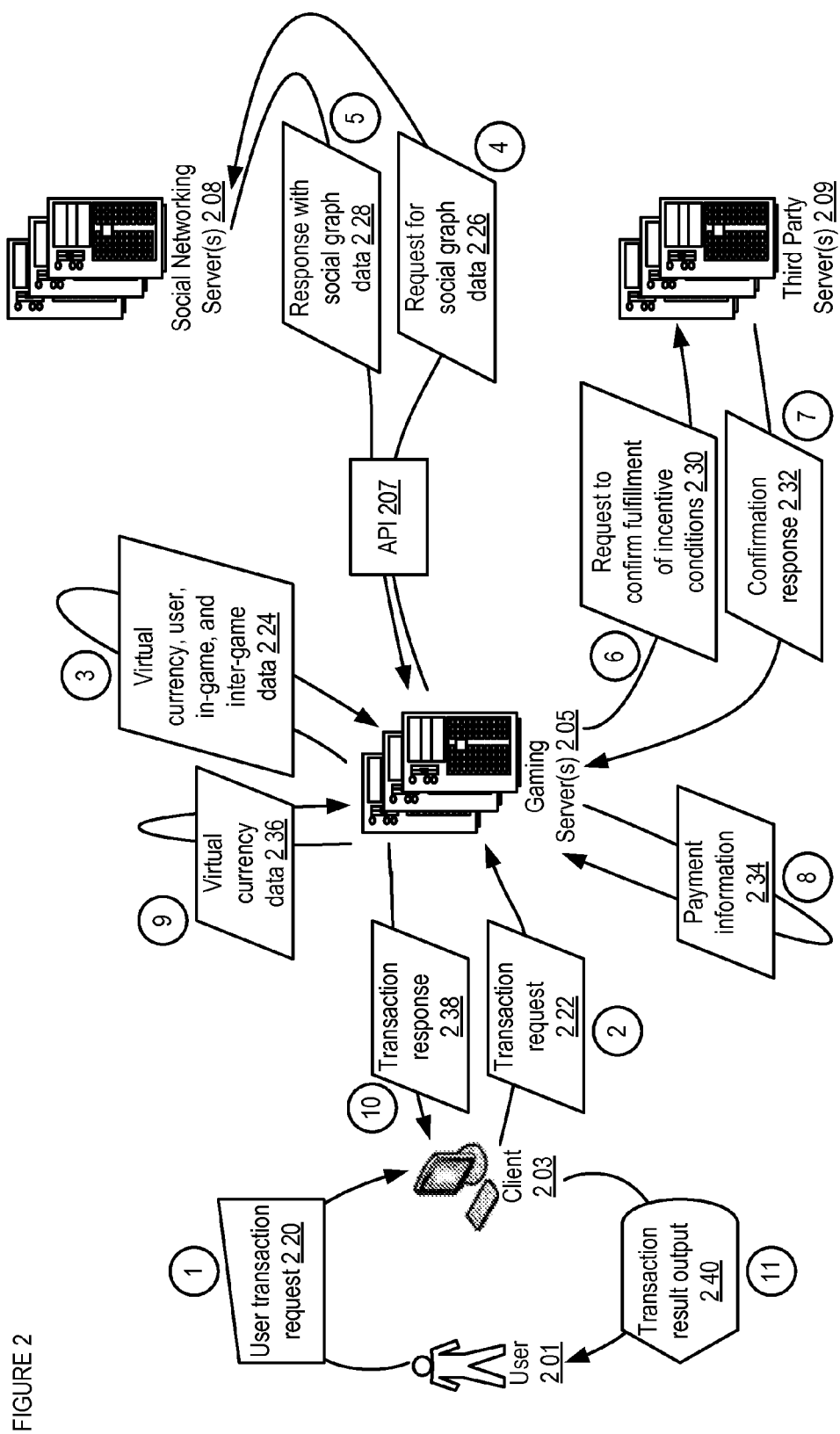
FIG. 2 illustrates data flow in one embodiment of the MIC platform.

FIG. 2 illustrates data flow in one embodiment of the MIC platform. In FIG. 2, a user 201 may send a user transaction request 220 to a client 203. In one embodiment, the user request may be a request to credit a user's account with virtual currency (e.g., see FIG. 1 and related figures). For example, the user may wish to purchase virtual currency (e.g., Reward Points in Zynga Game Network's Mafia Wars game). In another example, the user may wish to fulfill a third party incentive to receive an award of virtual currency. In one implementation, the user may use a keyboard, a mouse, and/or the like to input the user transaction request 220 (e.g., using a user interface of a game). In one embodiment, the client 203 may send a transaction request 222 to a gaming server 205 (e.g., Zynga Game Network's Mafia Wars gaming server) to facilitate the transaction (e.g., a purchase of virtual currency). In one implementation, the transaction request 222 may include information regarding the transaction (e.g., user's UID, virtual currency type to be purchased, virtual currency amount to be purchased, and/or the like). For example, the transaction request may be in XML format and may take on the following form:

```
<XML>
    <UserUID>User1234</UserUID>
    <VCType>Reward Points</VCType>
    <VCAmount>100</VCAmount>
</XML>
```

In one embodiment, the gaming server 205 may analyze data associated with the transaction 224. For example, the gaming server 205 may analyze data regarding the user, data regarding the virtual currency, in-game data, inter-game data, third-party data, and/or the like. In one implementation, this data may be retrieved from one or more table groups such as the User table group 1319a, the In-Game Data table group 1319c, the Inter-Game Data table group 1319d, the Third Party Data table group 1319*e*, and/or the like (e.g., using one or more SQL statements). In one implementation, this data may be analyzed (e.g., see FIG. 1 and related figures) to determine whether the user is eligible to receive requested virtual currency, to calculate the conversion rate between the requested virtual currency and the payment virtual currency, and/or the like. In one embodiment, the gaming server 205 may use an application programming interface (API) 207 to request social graph data from a social networking server 208 (e.g., Facebook, MySpace, and/or the like). In one implementation, the gaming server 205 may send a request for social graph data 226 to the social networking server 208 in accordance with the API 207, and receive a response with social graph data 228. In another implementation, social graph data may have been previously received (e.g., when the user signed up to play the game, during a periodic update, and/or the like) and the social graph data may be retrieved from the Social Graph table group 1319*b* (e.g., using one or more SQL statements). In one implementation, social graph data may be analyzed (e.g., see FIG. 1 and related figures) to determine whether the user is eligible to receive the requested virtual currency, to calculate the conversion rate between the requested virtual currency and the payment virtual currency, and/or the like. In one embodiment (e.g., if the user wishes to fulfill a third party incentive to receive an award of virtual currency), the gaming server 205 may contact a third party server 209 to receive a confirmation that the user fulfilled conditions of the third party incentive. In one implementation, the gaming server 205 may send a request to confirm fulfillment of incentive conditions 230. For example, the confirmation request may be in XML format and may take on the following form:

```
<XML>
    <UserUID>User1234</UserUID>
    <TransactionUID>Transaction456</TransactionUID>
    <IncentiveUID>Incentive789</IncentiveUID>
</XML>
```

In one implementation, the third party server 209 may respond to the gaming server 205 with a confirmation response 232 (e.g., in XML format including the UID of the transaction, user, and/or the like). In another implementation, the confirmation response may have been previously received, and the confirmation may be retrieved from the Third Party Data table group 1319*e* (e.g., using one or more SQL statements). The confirmation may be used to determine whether the user is eligible to receive an award of virtual currency (e.g., see FIG. 1 and related figures). In another embodiment (e.g., if the user wishes to purchase virtual currency), payment information 234 may be analyzed (e.g., see FIG. 1 and related figures) to determine whether the user agrees to pay for the requested virtual currency (e.g., using real currency, virtual currency, and/or the like). In one embodiment, virtual currency data 236 associated with the user may be updated (e.g., see FIG. 1 and related figures) to reflect the transaction. For example, if the user has 50 Reward Points and purchases 100 Reward Points, the amount of Reward Points in the user's account in Mafia Wars may be increased to 150. In one embodiment, the gaming server 205 may send a transaction response 238 to the client 203. In one implementation, the transaction response 238 may include information updated as a result of the transaction. For example, the transaction response may be in XML format and may take on the following form:

```
<XML>
    <UserUID>User1234</UserUID>
    <VCType>Reward Points</VCType>
    <VCAmount>150</VCAmount>
</XML>
```

In one embodiment, the client 203 may output the result of the transaction 240 to the user 201. In one implementation, the client 203 may output the result using a monitor, speakers, a printer, and/or the like. For example, the client 203 may update the user interface display to reflect that the user 201 owns 150 Reward Points as a result of the transaction.

Figure 3:
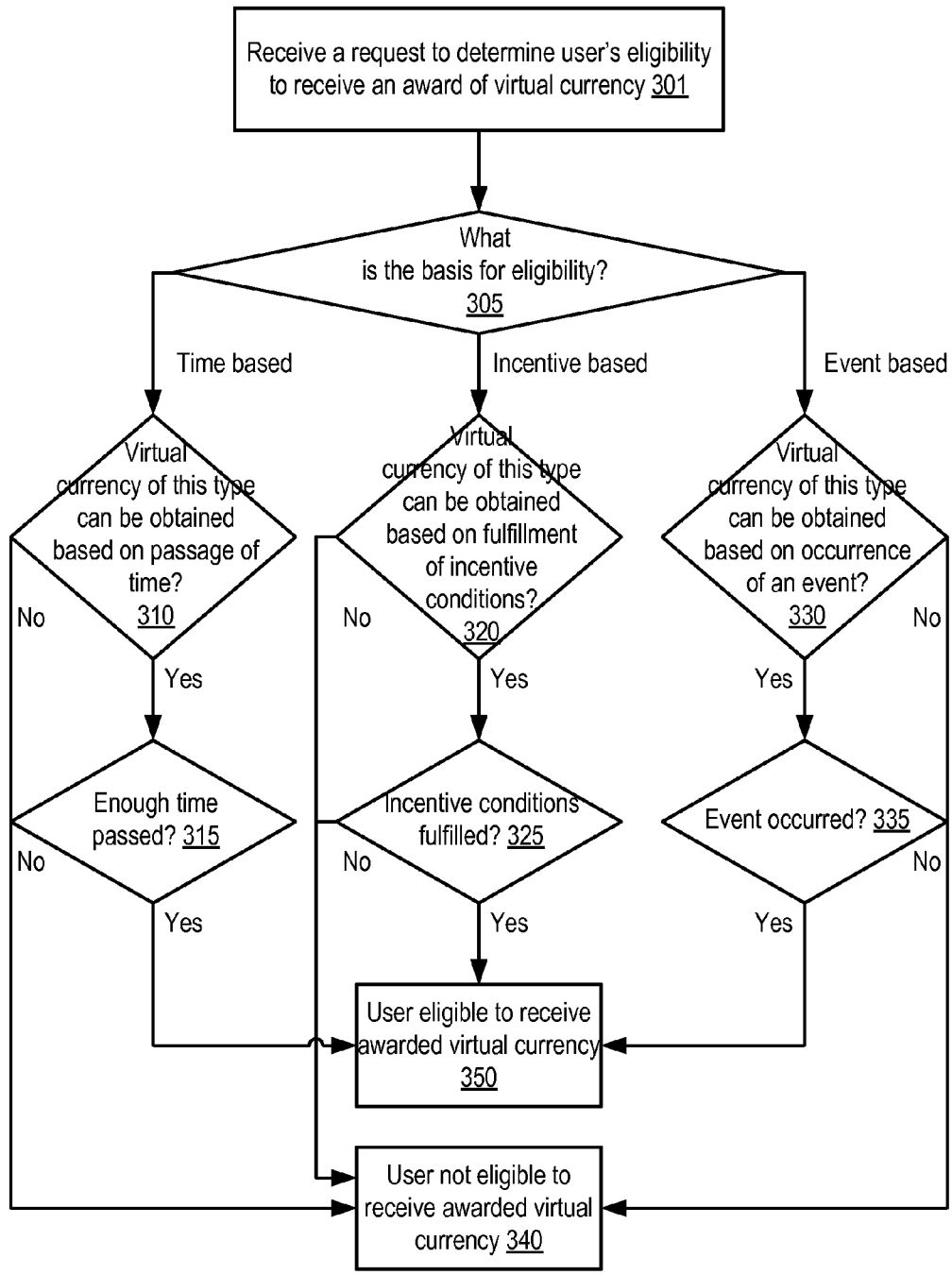
FIG. 3 is of a logic flow diagram illustrating an eligibility determining component in one embodiment of the MIC platform.

FIG. 3 is of a logic flow diagram illustrating an award eligibility determining component in one embodiment of the MIC platform. In FIG. 3, a request to determine a user's eligibility to receive an award of virtual currency is received at 301. For example, the user may try to collect virtual currency from in-game properties that generate virtual currency periodically (e.g., a Mega Casino in Zynga Game Network's Mafia Wars game). In another example, the user may fulfill an incentive (e.g., invite 5 friends to play the game) to receive an award of virtual currency. In yet another example, the user may be awarded virtual currency based on occurrence of an event (e.g., a virtual currency award for Halloween, a virtual currency award during a weekend, and/or the like).

The basis for award eligibility may be determined at 305. In one embodiment, an award of virtual currency may be based on passage of time, fulfillment of incentives, occurrence of events, and/or the like. In one implementation, the basis of award eligibility may be determined based on transaction type, which may be retrieved from the transaction details data structure using PHP (e.g., $TransactionType=$transactionDetails["Transaction-Type"];). For example, the transaction type may indicate that the transaction is a "periodic energy award" and the MIC platform may determine that such a transaction is an "award based on passage of time" based on game logic rules. In another implementation, the basis of award eligibility may be determined based on transaction subtype, which may be retrieved from the transaction details data structure using PHP (e.g., $TransactionSubType=$transactionDetails ["TransactionSubType"];). For example, the transaction subtype may indicate that the transaction is an "award based on passage of time."

If the basis for award eligibility is based on passage of time, a determination may be made at 310 whether virtual currency of the requested type may be obtained based on passage of time. For example, ordinary virtual currency (e.g., New York Dollars, energy, and/or the like) may be obtained based on passage of time, while special virtual currency (e.g., Royalé poker chips, and/or the like) may not be obtained based on passage of time. In one embodiment, information regarding which virtual currency types may be obtained based on passage of time may be stored in the Currency table group 1319*f*. In one implementation, this information may be retrieved from the Currency table group 1319*f* using a SQL statement (e.g., SELECT TimeAwardEligibility FROM EligibilityTable WHERE VCType='VC Type requested'). In another embodiment, information regarding which virtual currency types may be obtained based on passage of time may be determined by game logic rules. If the determination at 310 is affirmative, a determination may be made at 315 to determine whether enough time passed to make the user eligible to receive an award of virtual currency. In one embodiment, the determination may be made based on data in the In-Game Data table group 1319c. In one implementation, the time at which the user may be eligible to receive an award of virtual currency of the requested type may be retrieved from the In Game Data table group 1319c using a SQL statement (e.g., SELECT VCAwardTime FROM VCAwardTimesTable WHERE user_UID='User's UID' AND VCType='VC Type requested'), and compared to the current time to make the determination.

If the basis for award eligibility is based on fulfillment of incentives, a determination may be made at 320 whether virtual currency of the requested type may be obtained based on fulfillment of incentives. For example, special virtual currency (e.g., Royalé poker chips, and/or the like) may be obtained based on fulfillment of in game, inter-game, and third party incentives, while ordinary virtual currency (e.g., New York Dollars, energy, and/or the like) may be obtained based on fulfillment of in-game and inter-game incentives, but not based on fulfillment of third party incentives. In one embodiment, information regarding which virtual currency types may be obtained based on fulfillment of incentives may be stored in the Currency table group 1319f. In one implementation, this information may be retrieved from the Currency table group 1319f using a SQL statement (e.g., SELECT IncentiveAwardEligibility FROM EligibilityTable WHERE VCType='VC Type requested'). In another embodiment, information regarding which virtual currency types may be obtained based on fulfillment of incentives may be determined by game logic rules. If the determination at 320 is affirmative, a determination may be made at 325 to determine whether the user fulfilled incentive conditions that may make the user eligible to receive an award of virtual currency. In one embodiment, in-game data, inter-game data, third party data, social graph data, and/or the like may be used to determine whether a user fulfilled incentive conditions. See FIG. 4 for additional details regarding determining whether a user fulfilled incentive conditions.

If the basis for award eligibility is based on occurrence of events, a determination may be made at 330 whether virtual currency of the requested type may be obtained based on occurrence of events. For example, both ordinary virtual currency (e.g., New York Dollars, energy, and/or the like) and special virtual currency (e.g., Royalé poker chips, and/or the like) may be obtained based on occurrence of events. In one embodiment, information regarding which virtual currency types may be obtained based on occurrence of events may be stored in the Currency table group 1319f. In one implementation, this information may be retrieved from the Currency table group 1319f using a SQL statement (e.g., SELECT EventAwardEligibility FROM EligibilityTable WHERE VCType='VC Type requested'). In another embodiment, information regarding which virtual currency types may be obtained based on occurrence of events may be determined by game logic rules. If the determination at 330 is affirmative, a determination may be made at 335 to determine whether an event that makes the user eligible to receive an award of virtual currency has occurred. In one embodiment, the determination may be made based on data in the In-Game Data table group 1319c. In one implementation, the time at which the event occurs may be retrieved from the In Game Data table group 1319c using a SQL statement (e.g., SELECT EventTime FROM EventsTable WHERE EventUID='UID of the event associated with the transaction'), and compared to the current time to make the determination.

If a determination at 310, 315, 320, 325, 330, or 335, is negative, the award eligibility determining component determines that the user is ineligible to receive an award of virtual currency at 340. Otherwise, the award eligibility determining component determines that the user is eligible to receive an award of virtual currency at 350.

Figure 4:
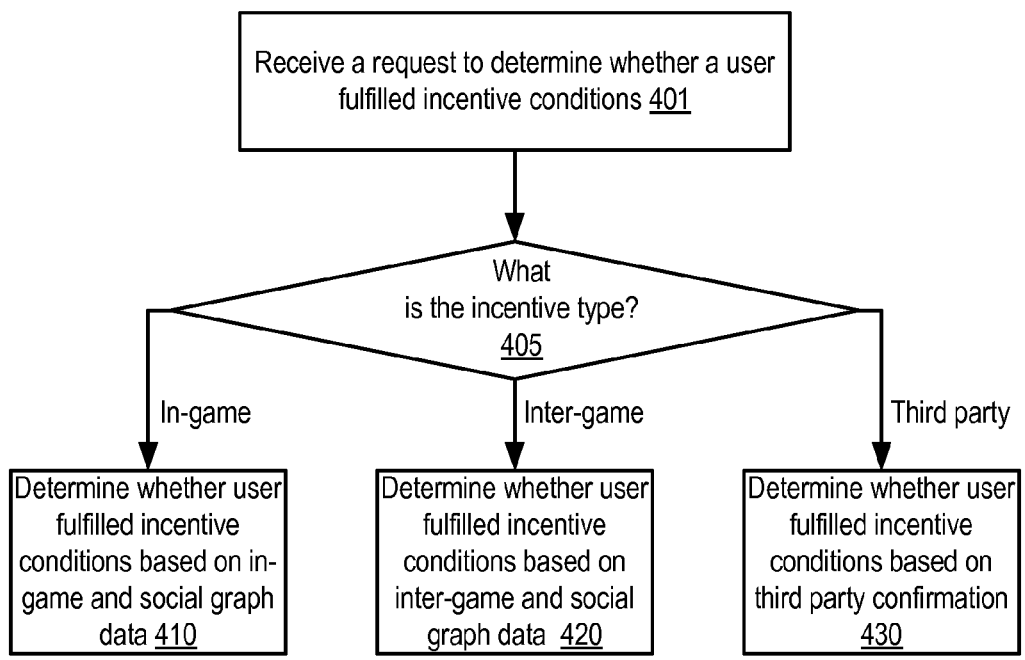
FIG. 4 is of a logic flow diagram illustrating an incentive conditions fulfillment component in one embodiment of the MIC platform.

FIG. 4 is of a logic flow diagram illustrating an incentive conditions fulfillment component in one embodiment of the MIC platform. In one embodiment, the incentive conditions fulfillment component may be used to determine whether a user has fulfilled incentive conditions that make the user eligible to receive an award of virtual currency. In FIG. 4, a request to determine whether a user has fulfilled incentive conditions may be received at 401. As discussed with regard to FIG. 1, in one embodiment, transaction details associated with the request may be included in the transaction details data structure included as part of the request.

At 405, the type of incentive associated with the transaction may be determined. In one embodiment, an incentive may be an in-game incentive, an inter game incentive, a third party incentive, and/or the like. In one implementation, the type of incentive may be determined based on transaction type, which may be retrieved from the transaction details data structure using PHP (e.g., $TransactionType=$transactionDetails["Transaction-Type"];). For example, the transaction type may indicate that the transaction is an "award of virtual currency based on an in-game incentive" and the MIC platform may determine that the incentive is an "in-game incentive" based on game logic rules. In another implementation, incentive type may be retrieved from the transaction details data structure using PHP (e.g., $IncentiveType=$transactionDetails["Incentive-Type"];). For example, the incentive type may indicate that the incentive is a "third-party incentive."

If the incentive is an in-game incentive, a determination may be made at 410 whether the user fulfilled incentive conditions. For example, an in-game incentive may specify that a user who invites a specified number of friends to play a game may receive virtual currency as a reward. In one embodiment, in-game incentives available to the user and/or rewards associated with the in-game incentives may depend on in-game data, social graph data, and/or the like associated with the user. For example, if a user's social graph indicates that the user has many friends (e.g., based on a predetermined number, percentage, and/or the like) who are not currently playing a game (e.g., Zynga Game Networks Mafia Wars game), the user may be offered an in-game incentive (e.g., 2 Reward Points) for inviting and having a specified number of user's friends (e.g., 5) join the game. In another example, if the user's social graph indicates that the user has many friends who are currently playing the game, the user may be offered an in-game incentive (e.g., an Energy Pack) for providing in-game help to these friends (e.g., sending Energy Packs to friends). In one embodiment, the determination whether the user fulfilled incentive conditions may be based on in-game data, social graph data, and/or the like associated with the user. For example, in-game data, social graph data, and/or the like may be used to determine how many of the user's friends joined the game. In another example, incentive conditions may indicate that the user's friends have to reach a specified in-game level (e.g., level 4) and/or invite a specified number of friends, and the in-game data, social graph data, and/or the like associated with the user's friends may be used in the determination. In one implementation, the determination may be made based on data stored in the Social Graph table group 1319b, the In-Game Data table group 1319c, and/or the like (e.g., using a SQL statement to retrieve information such as the number of the user's friends that joined the game).

If the incentive is an inter-game incentive, a determination may be made at 420 whether the user fulfilled incentive conditions. For example, an inter-game incentive may specify that a user who achieves a specified level in one game (e.g., level 4 in Zynga Poker game) may receive virtual currency (e.g., New York Dollars) as a reward in another game (e.g., Zynga Game Networks Mafia Wars game). In one embodiment, inter-game incentives available to the user and/or rewards associated with the inter game incentives may depend on inter-game data, social graph data, and/or the like associated with the user. For example, if a user's social graph indicates that the user has friends who are not currently playing a game (e.g., Zynga Game Networks Mafia Wars game), but who spend money playing other games (e.g., Zynga Game Networks FrontierVille game), the user may be offered an inter-game incentive (e.g., 5 Reward Points) for inviting and having a specified number of these friends (e.g., 5) join the game. In one embodiment, the determination whether the user fulfilled incentive conditions may be based on inter-game data, social graph data, and/or the like associated with the user. For example, inter-game data, social graph data, and/or the like may be used to determine how many of the user's friends joined the game. In another example, incentive conditions may indicate that the user's friends have to invite a specified number of friends, and the inter-game data, social graph data, and/or the like associated with the user's friends may be used in the determination. In one implementation, the determination may be made based on data stored in the Social Graph table group 1319b, the Inter-Game Data table group 1319d, and/or the like (e.g., using a SQL statement to retrieve information such as the number of the user's friends that joined the game). In one implementation, the Inter-Game Data table group 1319d may be a shared table group accessible to games with inter-game incentives through a common application programming interface (API). For example, a game may use the Inter-Game Data table group 1319d to obtain information regarding a user from another game (e.g., the user's level in another game).

If the incentive is a third party incentive, a determination may be made at 430 whether the user fulfilled incentive conditions. For example, a third party incentive may specify that a user who joins a program offered by a third party may receive virtual currency as a reward (e.g., 125 Reward Points). In one embodiment, third party incentives available to the user and/or rewards associated with the third party incentives may depend on third party data, social graph data, and/or the like associated with the user. For example, if a user's social graph indicates that the user has few friends, the user may be offered third party incentives that involve joining a third party program instead of incentives that involve inviting friends to join a game. In one embodiment, the determination whether the user fulfilled incentive conditions may be based on third party data, social graph data, and/or the like associated with the user. For example, the user may be provided with a way to join a third party program (e.g., a website link), and a confirmation from the third party (e.g., using an XML token that includes the UID of the user) may indicate that the user joined the third party program and fulfilled incentive conditions. In one implementation, the determination may be made based on data stored in the Social Graph table group 1319b, the Third Party Data table group 1319e, and/or the like (e.g., using a SQL statement to retrieve information such as whether a user joined a third party program). See FIG. 5 for additional details regarding managing third party incentives.

Figure 5:
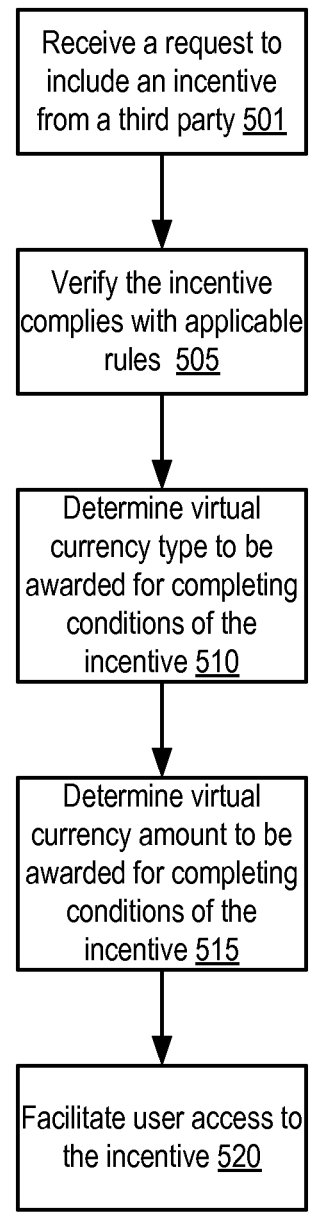
FIG. 5 is of a logic flow diagram illustrating a third party incentives management component in one embodiment of the MIC platform.

FIG. 5 is of a logic flow diagram illustrating a third party incentives management component in one embodiment of the MIC platform. In FIG. 5, a request to offer a third party incentive to game users is received at 501. For example, third party incentives may involve joining a third party program (e.g., a book club), subscribing to a magazine, purchasing a product, applying for a credit card, and/or the like. In one embodiment, a website with an application form may be provided to third parties wishing to offer third party incentives. In another embodiment, information regarding third party incentives may be received through a telephone, fax, email, mail and/or the like. At 505, the third party incentive may be checked to verify that the third party incentive complies with applicable rules (e.g., rules established by the game operator). For example, the game operator may verify that the third party incentive is appropriate for game users (e.g., based on target age of the third party incentive and ages of the game users). The type of virtual currency to be awarded for completing conditions of the third party incentive may be determined at 510, and the amount of virtual currency to be awarded for completing conditions of the third party incentive may be determined at 515. In one embodiment, information regarding the type and amount of virtual currency to be awarded may be parsed from the request and stored in the Third Party Data table group 1319e. In one implementation, standard XML formatting may be used to facilitate parsing and the information may be provided in the following form:

```
<XML>
    <VIRTUAL_CURRENCY_TYPE>Reward Points<VIRTUAL_
    CURRENCY_TYPE>
    <VIRTUAL_CURRENCY_AMOUNT>125<VIRTUAL_
    CURRENCY_AMOUNT>
    <INCENTIVE_LINK>URL of the incentive<INCENTIVE_LINK>
</XML>
```

User access to the third party incentive may be facilitated at 520. In one embodiment, a website link to a website associated with the third party incentive may be provided. In another embodiment, a telephone number, fax number, email address, mail address and/or the like may be provided.

Figure 6:
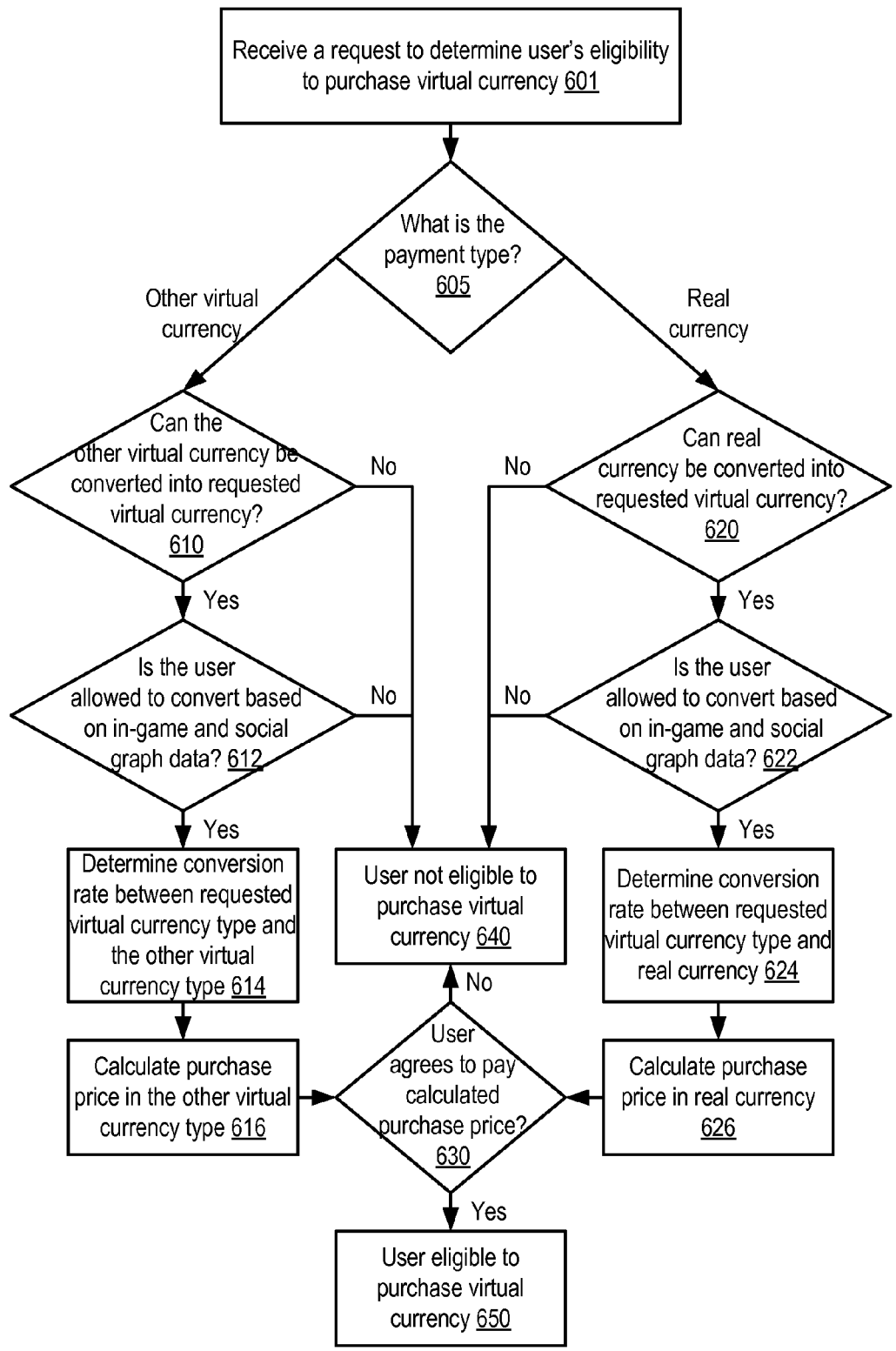
FIG. 6 is of a logic flow diagram illustrating a purchase eligibility determining component in one embodiment of the MIC platform.

FIG. 6 is of a logic flow diagram illustrating a purchase eligibility determining component in one embodiment of the MIC platform. In FIG. 6, a request to determine a user's eligibility to purchase virtual currency is received at 601. For example, the user may try to purchase special virtual currency (e.g., Royalé poker chips) using real currency (e.g., U.S. dollars). In another example, the user may try to convert one virtual currency (e.g., New York Dollars in Zynga Game Networks Mafia Wars game) into another virtual currency (e.g., Las Vegas Chips).

The payment type associated with the virtual currency purchase may be determined at 605. In one embodiment, the payment type may be real currency, virtual currency, and/or the like. In one implementation, the payment type may be determined based on the information in the transaction details data structure using PHP (e.g., $PaymentType=$transactionDetails["PaymentType"];). For example, the payment type may be New York Dollars. In another example, the payment type may be U.S. dollars.

If transaction information indicates that a virtual currency is used as a payment type, a determination may be made at 610 whether the payment virtual currency may be converted into the requested virtual currency. For example, this determination may be based on the types of payment virtual currency and requested virtual currency (e.g., Reward Points may be used to purchase New York Dollars, but not vice versa). See FIG. 7 for additional details regarding determining whether the payment virtual currency may be converted into the requested virtual currency.

If the payment virtual currency may be converted into the requested virtual currency, a determination may be made at 612 whether the user is allowed to convert payment virtual currency into the requested virtual currency. For example, this determination may be made based on information regarding the user (e.g., user's in game level). In one embodiment, in-game data (e.g., stored in In-Game Data table group 1319c), social graph data (e.g., stored in Social Graph table group 1319b), and/or the like associated with the user may be analyzed to make this determination. In one implementation, the user's in-game level, properties, abilities, and/or the like may be used to determine whether the user is allowed to convert between specified currencies. For example, a high level player that built a special structure (e.g., a Vault in Zynga Game Networks Mafia Wars game) may be allowed to convert between the specified currencies (e.g., New York Dollars and Las Vegas Chips), while a low level player that does not have the special structure (e.g., a low level player who cannot access Las Vegas area) may not be allowed to convert between the specified currencies. In another implementation, information regarding the user's social graph may be used to determine whether the user is allowed to convert between specified currencies. For example, a user who invited a specified number of friends (e.g., fulfills conditions of an incentive) to play the game may be rewarded by being allowed to convert between the specified currencies.

If the user is allowed to convert the payment virtual currency into the requested virtual currency, a conversion rate between the payment virtual currency and the requested virtual currency may be determined at 614. For example, the conversion rate may be static (e.g., it may be retrieved from a database). In another example, the conversion rate may be calculated dynamically (e.g., based on information associated with the user). See FIG. 9 for additional details regarding determining the conversion rate between payment virtual currency and requested virtual currency.

A purchase price for the requested virtual currency expressed in payment virtual currency may be calculated at 616. In one embodiment, the purchase price may be calculated based on the conversion rate determined at 614. In one implementation, the purchase price may be calculated by multiplying the amount of the requested virtual currency (e.g., determined at 110) by the conversion rate. For example, if the conversion rate is 500 New York Dollars for 1 Las Vegas Chip, a purchase of 2,000 Las Vegas Chips would entail a payment of 2,000*500=1,000,000 New York Dollars. A determination may be made at 630 whether the user agrees to pay the calculated purchase price (e.g., by requesting confirmation to proceed with payment from the user). If a determination at 610, 612, or 630 is negative, the purchase eligibility determining component determines that the user is ineligible to purchase virtual currency at 640. Otherwise, the purchase eligibility determining component determines that the user is eligible to purchase virtual currency at 650.

If transaction information indicates that a real currency is used as a payment type, a determination may be made at 620 whether the real currency may be converted into the requested virtual currency. For example, this determination may be based on the types of real currency and requested virtual currency (e.g., U.S. dollars may be used to purchase Reward Points, but not energy or New York Dollars). See FIG. 8 for additional details regarding determining whether the real currency may be converted into the requested virtual currency.

If the real currency may be converted into the requested virtual currency, a determination may be made at 622 whether the user is allowed to convert the real currency into the requested virtual currency. For example, this determination may be made based on information regarding the user (e.g., user's in-game level). In one embodiment, in-game data (e.g., stored in In-Game Data table group 1319c), social graph data (e.g., stored in Social Graph table group 1319b), and/or the like associated with the user may be analyzed to make this determination. In one implementation, the user's in-game level, properties, abilities, and/or the like may be used to determine whether the user is allowed to convert between specified currencies. For example, the amount of special Royalé poker chips that a user may be allowed to buy (e.g., per day, total, and/or the like) may be limited by the user's in-game achievements, and the user may not be allowed to purchase special Royalé poker chips beyond the limit. In another implementation, information regarding the user's social graph may be used to determine whether the user is allowed to convert between specified currencies. For example, a user who invited a specified number of friends (e.g., fulfills conditions of an incentive) to play the game, may be rewarded by being allowed to purchase an otherwise unavailable type of virtual currency.

If the user is allowed to convert the real currency into the requested virtual currency, a conversion rate between the real currency and the requested virtual currency may be determined at 624. For example, the conversion rate may be static (e.g., it may be retrieved from a database). In another example, the conversion rate may be calculated dynamically (e.g., based on information associated with the user). See FIG. 9 for additional details regarding determining the conversion rate between real currency and requested virtual currency.

A purchase price for the requested virtual currency expressed in real currency may be calculated at 626. In one embodiment, the purchase price may be calculated based on the conversion rate determined at 624. In one implementation, the purchase price may be calculated by multiplying the amount of the requested virtual currency (e.g., determined at 110) by the conversion rate. For example, if the conversion rate is 1 U.S. dollar for 4 Reward Points, a purchase of 8 Reward Points would entail a payment of 8*¼=2 U.S. dollars. A determination may be made at 630 whether the user agrees to pay the calculated purchase price (e.g., by requesting confirmation to proceed with payment from the user). If a determination at 620, 622, or 630 is negative, the purchase eligibility determining component determines that the user is ineligible to purchase virtual currency at 640. Otherwise, the purchase eligibility determining component determines that the user is eligible to purchase virtual currency at 650.

Figure 7:
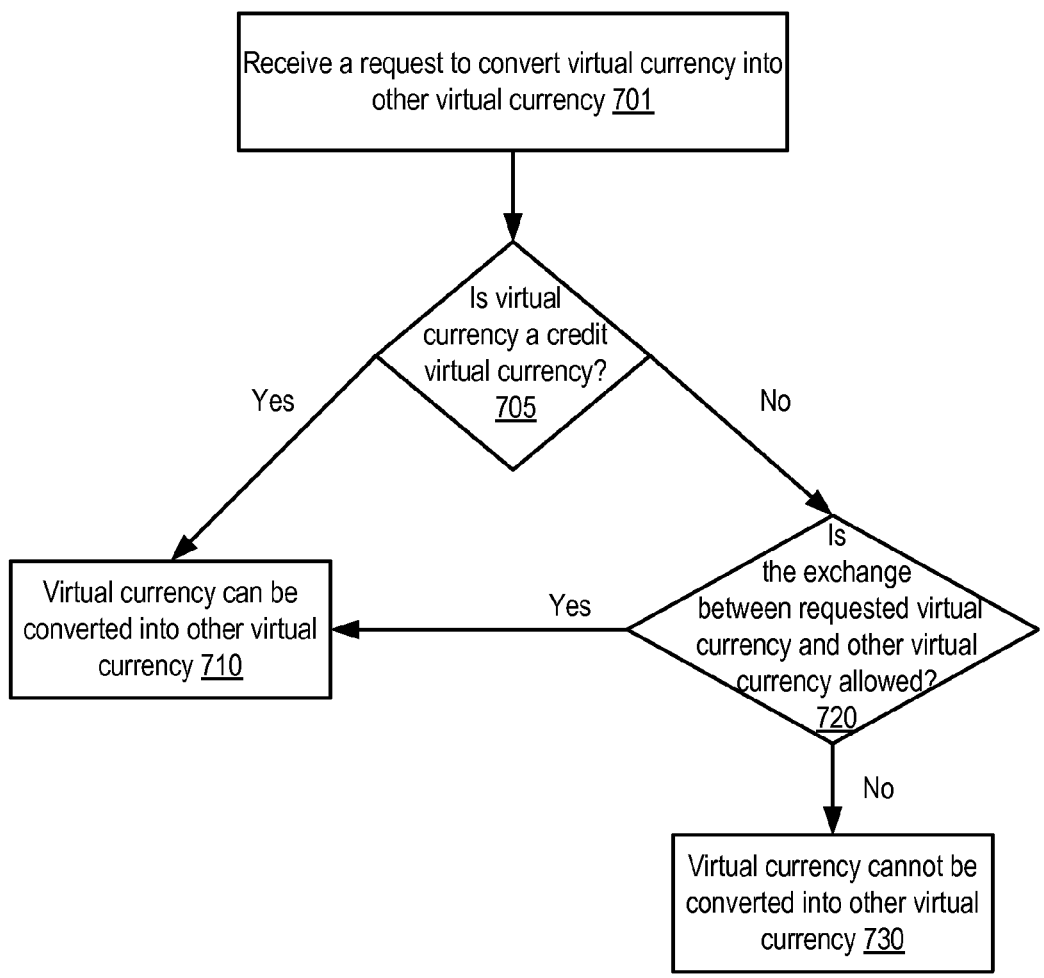
FIG. 7 is of a logic flow diagram illustrating a virtual currency conversion eligibility determining component in one embodiment of the MIC platform.

FIG. 7 is of a logic flow diagram illustrating a virtual currency conversion eligibility determining component in one embodiment of the MIC platform. In FIG. 7, a request to convert payment virtual currency into the requested virtual currency may be received at 701. For example, the user may wish to convert Reward Points into New York Dollars. In another example, the user may wish to convert Reward Points into energy by buying an Energy Pack game item. A determination may be made at 705 whether the payment virtual currency is a credit virtual currency. In one embodiment, a credit virtual currency may be a virtual currency (e.g., Reward Points, Lucky Horseshoes, and/or the like) that may be used to purchase other ordinary virtual currencies (e.g., New York Dollars, Moscow Rubles, and/or the like). In another embodiment, a credit virtual currency may be a meta virtual currency that may be used to purchase in-game virtual currency, but may not be used in the game. For example, a Zynga Game Card may be used to purchase other virtual currencies (e.g., Lucky Horseshoes or Frontier Coins in Zynga Game Networks FrontierVille game). In another example, meta virtual currency may be used to purchase other virtual currencies. In one embodiment, the determination at 705 may be made based on data stored in the Currency table group 1319f. In one implementation, this information may be retrieved from the Currency table group 1319f using a SQL statement (e.g., SELECT CreditVC FROM CurrencyTable WHERE VCType='VC Type of payment virtual currency from the transaction details data structure'). In another embodiment, the determination may be made based on game logic rules.

If the payment virtual currency is a credit virtual currency, the virtual currency conversion eligibility determining component may indicate at 710 that the payment virtual currency may be converted into the requested virtual currency. If the payment virtual currency is not a credit virtual currency, a determination may be made at 720 whether the exchange between requested virtual currency and payment virtual currency is allowed. In one embodiment, In-Game Data table group 1319c may store information regarding which currencies may be converted into other currencies. For example, the user may be allowed to convert ordinary virtual currency (e.g., New York Dollars) into credit virtual currency (e.g., Reward Points) during a special event, upon completion of a special mission, and/or the like. If the determination at 720 indicates that the conversion is allowed, the virtual currency conversion eligibility determining component may indicate at 710 that the payment virtual currency may be converted into the requested virtual currency. Otherwise, the virtual currency conversion eligibility determining component may indicate at 730 that the payment virtual currency may not be converted into the requested virtual currency.

Figure 8:
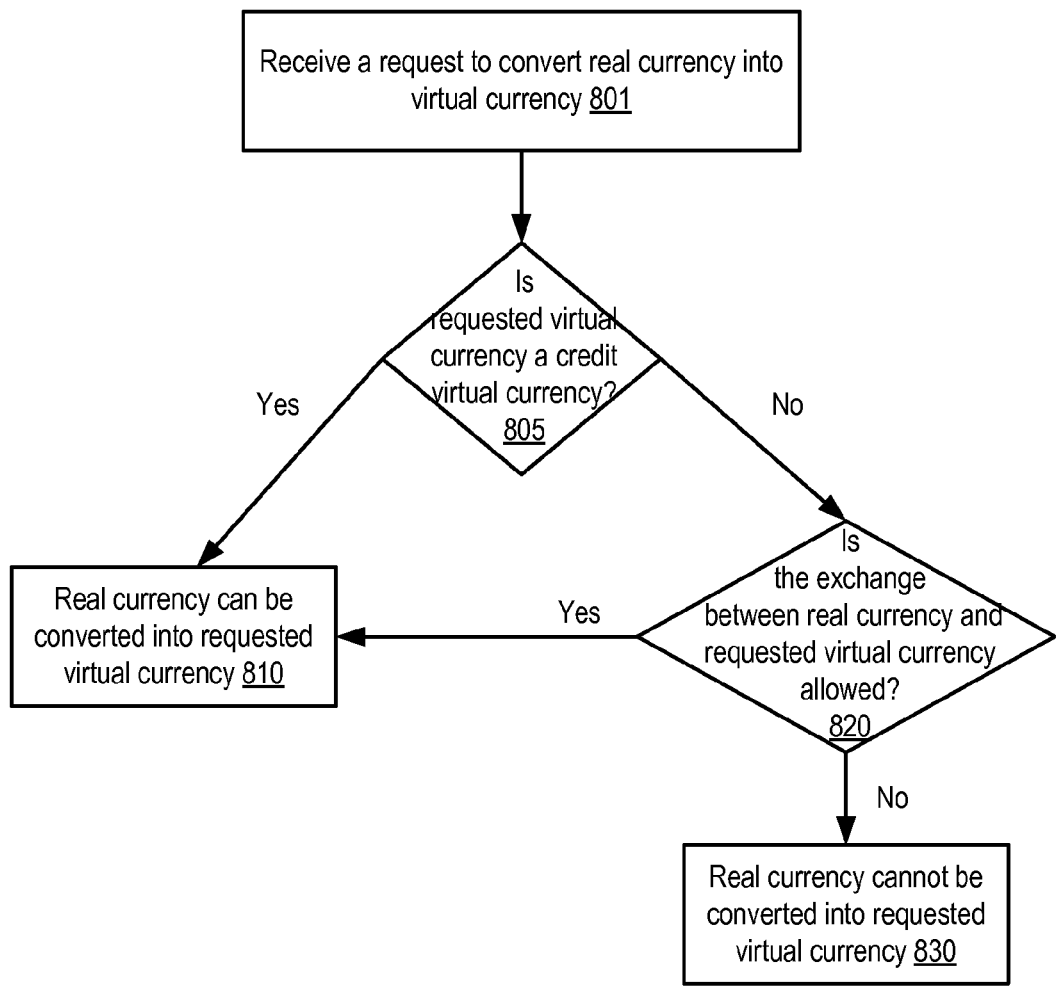
FIG. 8 is of a logic flow diagram illustrating a real currency conversion eligibility determining component in one embodiment of the MIC platform.

FIG. 8 is of a logic flow diagram illustrating a real currency conversion eligibility determining component in one embodiment of the MIC platform. In FIG. 8, a request to convert real currency into the requested virtual currency may be received at 801. For example, the user may wish to purchase Reward Points with real currency (e.g., using a credit card, PayPal, and/or the like). In another example, the user may wish to purchase Lucky Horseshoes using one or more real currency types such as U.S. Dollars, Euros, and/or the like. A determination may be made at 805 whether the requested virtual currency is a credit virtual currency. In one embodiment, a credit virtual currency may be a virtual currency that may be purchased with real currency and used in the game (e.g., Reward Points, Lucky Horseshoes, and/or the like). In one embodiment, the determination at 805 may be made based on data stored in the Currency table group 1319f. In one implementation, this information may be retrieved from the Currency table group 1319f using a SQL statement (e.g., SELECT CreditVC FROM CurrencyTable WHERE VCType='VC Type of requested virtual currency from the transaction details data structure'). In another embodiment, the determination may be made based on game logic rules.

If the requested virtual currency is a credit virtual currency, the real currency conversion eligibility determining component may indicate at 810 that the real currency may be converted into the requested virtual currency. If the requested virtual currency is not a credit virtual currency, a determination may be made at 820 whether the exchange between requested virtual currency and real currency is allowed. In one embodiment, In-Game Data table group 1319c may store information regarding which currencies may be converted into other currencies. For example, the user may be allowed to convert real virtual currency into ordinary virtual currency (e.g., New York Dollars) during special sales events, upon completion of a special mission, and/or the like. If the determination at 820 indicates that the conversion is allowed, the real currency conversion eligibility determining component may indicate at 810 that the real currency may be converted into the requested virtual currency. Otherwise, the real currency conversion eligibility determining component may indicate at 830 that the real currency may not be converted into the requested virtual currency.

Figure 9:
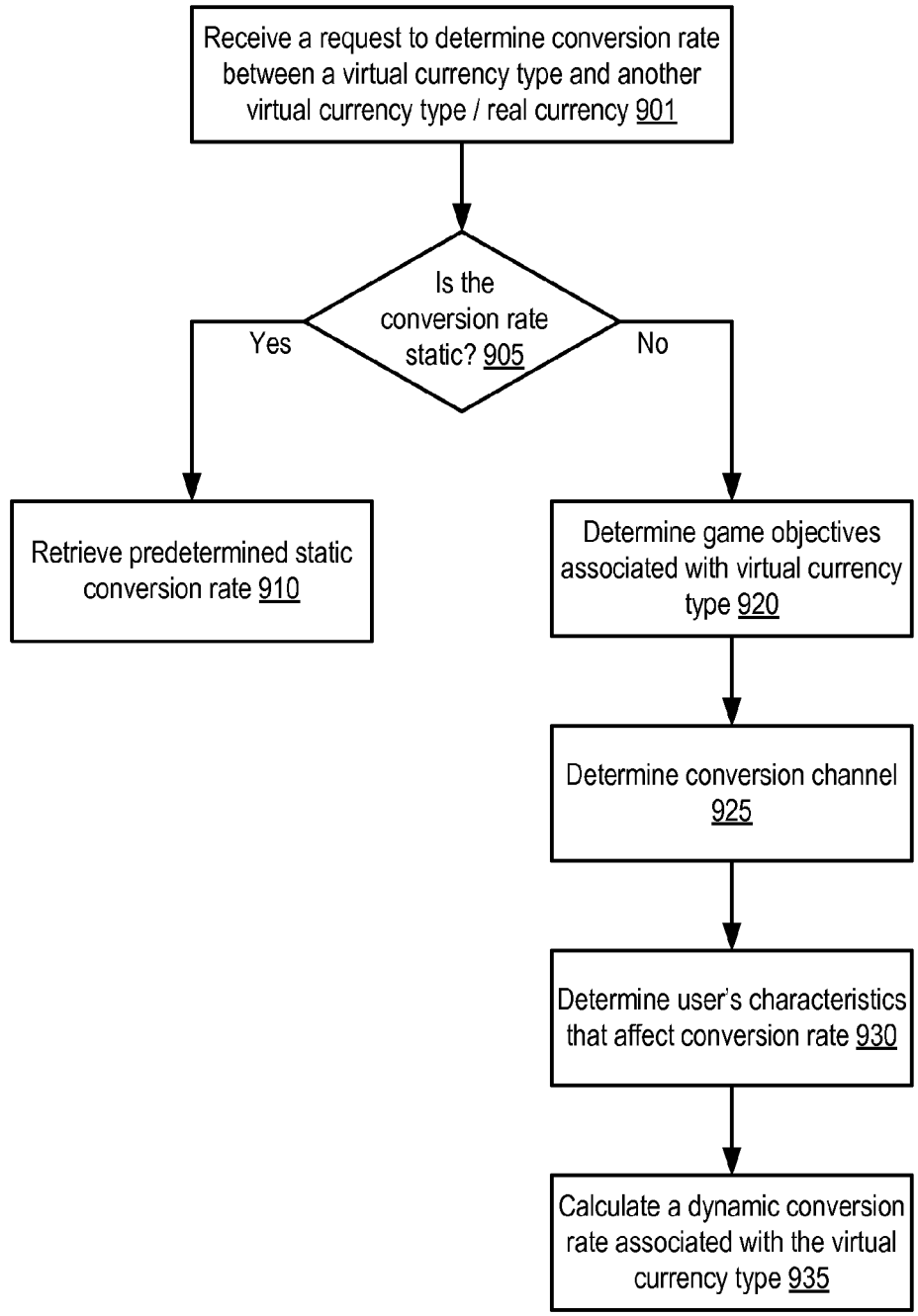
FIG. 9 is of a logic flow diagram illustrating a conversion rate determining component in one embodiment of the MIC platform.

FIG. 9 is of a logic flow diagram illustrating a conversion rate determining component in one embodiment of the MIC platform. In FIG. 9, a request to determine a conversion rate between a requested virtual currency type and a payment currency type may be received at 901. In one embodiment, the payment currency type may be a different virtual currency type. For example, the user may wish to convert between New York Dollars and Las Vegas Chips. In another embodiment, the payment currency type may be a real currency type. For example, the user may wish to convert between U.S. Dollars and Reward Points.

At 905 a determination may be made whether the conversion rate between the requested virtual currency type and the payment currency type is static. In one embodiment, the determination at 905 may be made based on data stored in the Currency table group 1319f. In one implementation, this information may be retrieved from the Currency table group 1319f using a SQL statement (e.g., SELECT ConversionType FROM ConversionsTable WHERE VCType1='VC Type of requested virtual currency' AND VCType2='Type of payment currency'). In another embodiment, the determination may be made based on game logic rules (e.g., conversion rate between Lucky Horseshoes and energy may be static, while conversion rate between U.S. Dollars and Reward Points may be dynamic).

If the determination is made at 905 that the conversion rate between the requested virtual currency type and the payment currency type is static, the predetermined static conversion rate may be retrieved at 910. In one embodiment, the conversion rate may be retrieved from the Currency table group 1319f using a SQL statement (e.g., SELECT ConversionRate FROM ConversionsTable WHERE VCType1='VC Type of requested virtual currency' AND VCType2='Type of payment currency'). In other embodiments, the conversion rate may be retrieved from a configuration file, hardcoded, and/or the like.

If the determination is made at 905 that the conversion rate between the requested virtual currency type and the payment currency type is dynamic, the dynamic conversion rate may be calculated based on game objectives associated with currency types, conversion channel (e.g., venue), the user's characteristics, and/or the like. For example, the game operator may wish to adjust the conversion rate based on the user's progression through the game. In another example, the game operator may wish to aggregate information regarding other users, and adjust the conversion rate based on a comparison of the user's progression through the game to the other users' progression through the game.

In one embodiment, game objectives associated with the virtual currency type may be determined at 920. For example, the game operator may wish to encourage players to be more social by giving better conversion rates to users who complete a special "social mission" that involves asking other users for help to complete the mission. In another example, the game operator may wish to control the pace at which players may progress through the game by adjusting the conversion rate between an ordinary virtual currency type (e.g., New York Dollars) and a credit virtual currency type (e.g., Reward Coins) to make progressing through the game faster (e.g., more New York Dollars per Reward Coin) or slower (e.g., fewer New York Dollars per Reward Coin). In yet another example, the game operator may wish to encourage users to buy more virtual currency by giving volume discounts (e.g., based on purchase amount in a transaction, based on total virtual currency purchased, based on total real currency spent, and/or the like). In one implementation, premium virtual currency (e.g., credit virtual currency, special virtual currency, and/or the like) may be tracked in an automated fashion to promote player actions in line with the game objectives. For example, the amount of a premium virtual currency type in the game may be assessed periodically (e.g., using a SQL statement to examine data in User table group 1319a to determine the amount of the premium currency type owned by all users-SELECT SUM(VCAmount) FROM UserCurrencyTable WHERE VCType='VC Type of the premium virtual currency'), and the conversion rate may be adjusted (e.g., based on the average amount of the premium currency type per user of an in-game user level). Thus, if the average amount of the premium virtual currency type for users with in-game level 5 is more than a threshold amount (e.g., 100), the base conversion rate (e.g., stored in the Currency table group 1319f) may be adjusted (e.g., from 15,000 New York Dollars per 1 Reward Point, to 12,000 New York Dollars per 1 Reward Point) to slow the pace of progress through the game.

In one embodiment, the conversion channel (e.g., venue) used by the user to convert between the requested virtual currency type and the payment currency may be determined at 925. For example, the game operator may offer different conversion rates to the user depending on whether the user pays the game operator directly (e.g., purchases Reward Points from within Mafia Wars game using a credit card), or through a third party (e.g., buys a gift card from a store, and/or the like). In another example, the game operator may offer different conversion rates to the user depending on whether the user obtains the requested virtual currency through the game operator's website (e.g., by playing FarmVille game on FarmVille.com and purchasing the requested virtual currency from within the game), or through a third party website (e.g., by playing FarmVille game on Facebook and purchasing the requested virtual currency from within the game). In one implementation, data regarding adjustment to conversion rates associated with the conversion channel may be stored in the Currency table group 1319f. In one implementation, adjustments to conversion rates associated with the conversion channel may be determined by game logic rules (e.g., the user gains 10% more Reward Points when purchasing through the iPhone Mafia Wars application than the base amount).

In one embodiment, the user's characteristics that may affect the conversion rate may be determined at 930. For example, the user's progression through the game may be monitored (e.g., the amount of time the user spent playing the game without increasing the user's in-game level) and the user may get a more favorable conversion rate (e.g., the user gains 40% more Reward Points than the base amount) if the user seems to be stuck (e.g., the user did not gain an in-game level after playing the game for 2 weeks). In another example, the user's progression through the game compared to other players may be monitored (e.g., the number of mouse clicks it takes a user to complete a level may be compared to the number of mouse clicks it takes other users to complete the same level on average), and the user may get a more favorable conversion rate (e.g., the user gains 30% more Reward Points than the base amount) if the user performs more clicks than the average (e.g. 25% more clicks) to complete the level (decrease game difficulty), and the user may get a less favorable conversion rate (e.g., the user gains 30% less Reward Points than the base amount) if the user performs fewer clicks than the average (e.g. 25% fewer clicks) to complete the level (increase game difficulty). In one implementation, the user's conversion rate may be progressively adjusted (e.g., using predetermined rules, a mathematical function, and/or the like) based on the difficulty the user is having progressing through the level (e.g., if it takes 100 clicks on average to pass a level and the user has made 150 clicks so far, the user may get an extra 25% more Reward Points, if the user has made 200 clicks so far, the user may get 40% more Reward Points). In yet another example, if the user invites some number of friends in the user's social graph (e.g., at least 10 friends) to play a game (e.g., Mafia Wars game), the user may be rewarded with a more favorable currency conversion rate (e.g., the user gains 25% more Reward Points than the base amount). In yet another example, the user's in-game level may affect the conversion rate (e.g., the user gains 1% more Reward Points than the base amount for every 10 in-game levels level 22 user gains extra 2%, level 86 user gains extra 8%, and/or the like). In one implementation, data regarding adjustments to conversion rates due to user characteristics may be stored in the Currency table group 1319f and adjustments associated with the user may be determined based on data stored in the User table group 1319a, the Social Graph table group 1319b, the In-Game Data table group 1319c, the Inter-Game Data table group 1319d, and/or the like (e.g., using one or more SQL statements). For example, if the data in the Currency table group 1319f specifies that inviting 10 friends to play a game improves the conversion rate by 25%, data in the Social Graph table group 1319b may be checked to determine whether the user invited 10 friends and should get the improved conversion rate. In one implementation, adjustments to conversion rates associated with the user's characteristics may be determined by game logic rules (e.g., rules following the examples discussed above).

At 935, the dynamic conversion rate between the requested virtual currency type and the payment currency type may be calculated. In one embodiment, this calculation may be based on the game objectives associated with currency types, the conversion channel (e.g., venue), the user's characteristics, and/or the like. In one implementation, adjustments to the base conversion rate may be aggregated to produce a dynamic conversion rate (e.g., if the base conversion rate is 15,000 New York Dollars per 1 Reward Point, and a level 86 (+8% or +1,200 New York Dollars) user is purchasing New York Dollars through the iPhone Mafia Wars application (+10% or +1,500 New York Dollars) the user's dynamic conversion rate may be 15,000+1,200+1,500=17,700 New York Dollars per 1 Reward Point).

Figure 10:
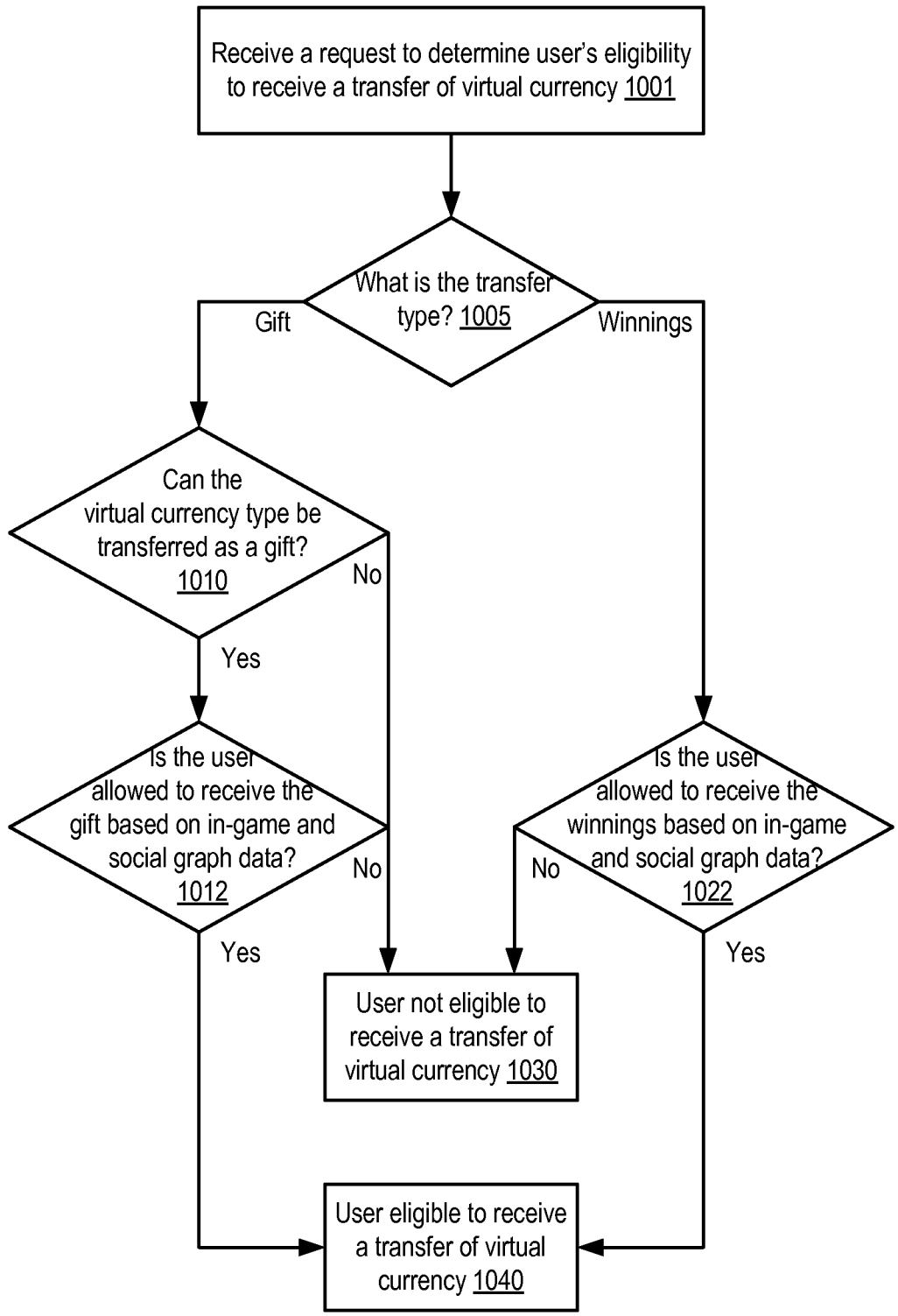
FIG. 10 is of a logic flow diagram illustrating a transfer eligibility determining component in one embodiment of the MIC platform.

FIG. 10 is of a logic flow diagram illustrating a transfer eligibility determining component in one embodiment of the MIC platform. In FIG. 10, a request to determine a user's eligibility to receive a transfer of virtual currency is received at 1001. For example, a user may receive a gift of virtual currency (e.g., a gift from a friend in the user's social graph). In another example, the user may win virtual currency (e.g., by winning a hand of poker in Zynga Poker game, by spinning a Slot Machine in Mafia Wars game, and/or the like).

The type of transfer may be determined at 1005. In one embodiment, the transfer type may be a gift, game winnings, and/or the like. In one implementation, the transfer type may be determined based on transaction type, which may be retrieved from the transaction details data structure using PHP (e.g., $TransactionType=$transactionDetails["TransactionType"];). For example, the transaction type may indicate that the transaction is a "gift."

If the transfer type is a gift, a determination may be made at 1010 whether virtual currency of the requested type may be gifted. For example, ordinary virtual currency (e.g., Bangkok Baht, energy, and/or the like) may be gifted, while special virtual currency (e.g., Royalé poker chips, and/or the like) may not be gifted. In one embodiment, information regarding which virtual currency types may be gifted may be stored in the Currency table group 1319*f*. In one implementation, this information may be retrieved from the Currency table group 1319*f* using a SQL statement (e.g., SELECT GiftEligibility FROM EligibilityTable WHERE VCType='VC Type requested'). In another embodiment, information regarding which virtual currency types may be gifted may be determined by game logic rules.

If the transferred virtual currency may be gifted, a determination may be made at 1012 whether the user is allowed to receive the transferred virtual currency as a gift. For example, this determination may be made based on information regarding the user (e.g., user's in-game level). In one embodiment, in-game data (e.g., stored in In Game Data table group 1319*c*), social graph data (e.g., stored in Social Graph table group 1319*b*), and/or the like associated with the user may be analyzed to make this determination. In one implementation, the user's in-game level, properties, abilities, and/or the like may be used to determine whether the user is allowed to receive the transferred virtual currency as a gift. For example, a low level player who has not unlocked Moscow area in Zynga Game Networks Mafia Wars game may not be allowed to receive Moscow Rubles as a gift, while a high level player who has unlocked the Moscow area may be allowed to receive Moscow Rubles as a gift. In another implementation, information regarding the user's social graph may be used to determine whether the user is allowed to receive the transferred virtual currency as a gift. For example, a user who sends gifts to a specified number of friends (e.g., 20) may be rewarded by being allowed to receive a larger amount (e.g., twice as large as normally allowed) of virtual currency as a gift.

If the transfer type is game winnings, a determination may be made at 1022 whether the user is allowed to receive the game winnings For example, this determination may be made based on information regarding the user (e.g., user's in game level). In one embodiment, in-game data (e.g., stored in In-Game Data table group 1319*c*), social graph data (e.g., stored in Social Graph table group 1319*b*), and/or the like associated with the user may be analyzed to make this determination. In one implementation, the user's in-game level, properties, abilities, and/or the like may be used to determine whether the user is allowed to receive the game winnings For example, a low level player may not be allowed to receive a special currency type (e.g., Royalé poker chips) and may have to forfeit that part of the game winnings, while a high level character may be allowed to receive the special currency type and may keep the entire game winnings. In another implementation, information regarding the user's social graph may be used to determine whether the user is allowed to receive the game winnings. For example, a user who sends gifts to a specified number of friends (e.g., 20) may be rewarded by being allowed to win a larger amount (e.g., twice as large) of a special currency type (e.g., Royalé poker chips) than normally allowed based on the user's in-game level.

If a determination at 1010, 1012, or 1022 is negative, the transfer eligibility determining component determines that the user is ineligible to receive a transfer of virtual currency at 1030. Otherwise, the transfer eligibility determining component determines that the user is eligible to receive a transfer of virtual currency at 1040.

Figure 11:
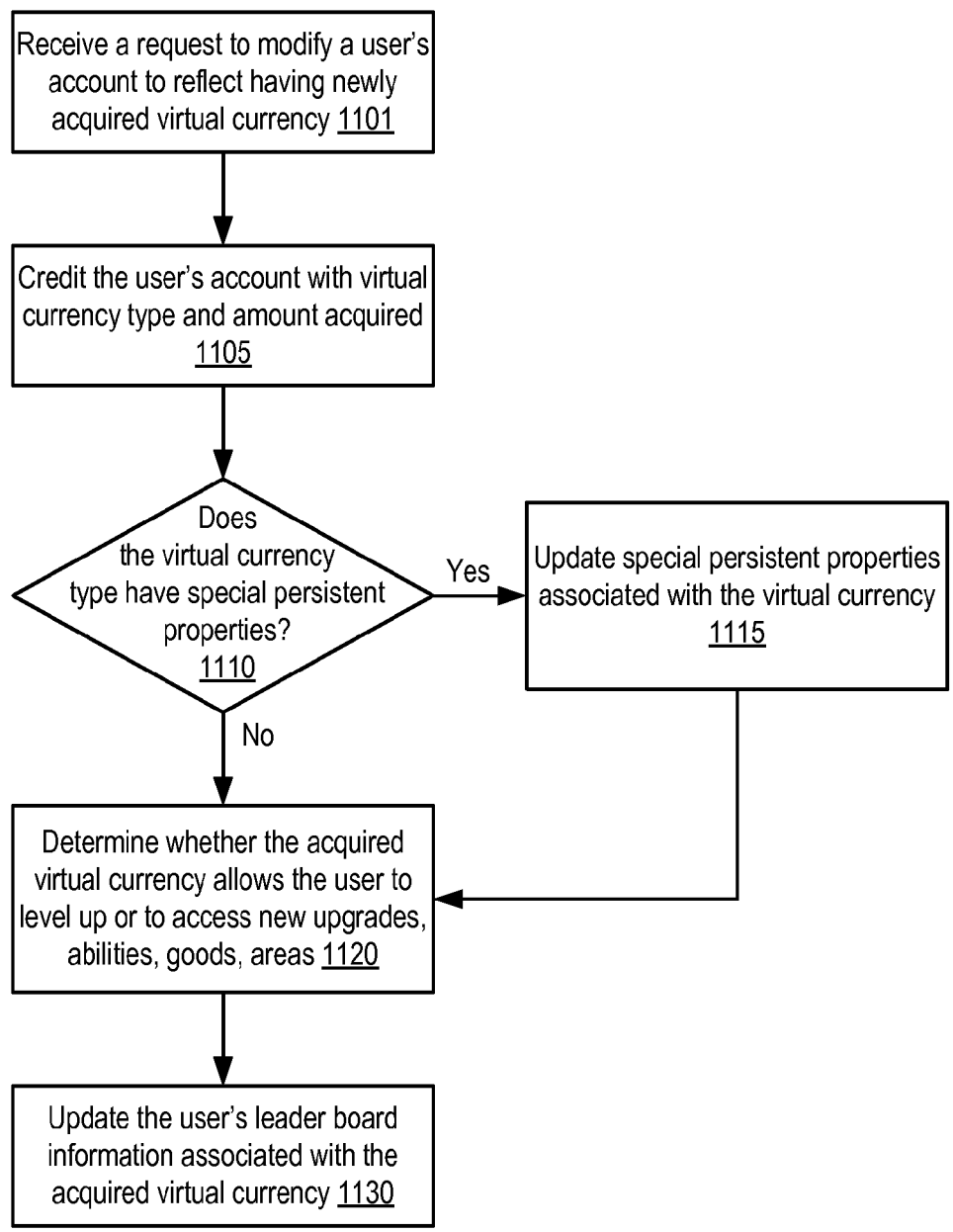
FIG. 11 is of a logic flow diagram illustrating a user account modifying component in one embodiment of the MIC platform.

FIG. 11 is of a logic flow diagram illustrating a user account modifying component in one embodiment of the MIC platform. In FIG. 11, a request to modify a user's account to reflect the acquisition of virtual currency may be received at 1101. For example, the user may acquire virtual currency by receiving an award of virtual currency (e.g., time based award, incentive based award, event based award, and/or the like). In another example, the user may acquire virtual currency by purchasing virtual currency (e.g., using other virtual currency, using real currency, and/or the like). In yet another example, the user may acquire virtual currency by receiving a transfer of virtual currency (e.g., a gift from a friend, game winnings, and/or the like).

The user's account may be credited with the virtual currency type and amount acquired at 1105. For example, the user's account may be credited with 100 Reward Points purchased by the user with a Credit Card. In one embodiment, the type and amount of acquired virtual currency may be determined by the MIC platform as discussed in FIG. 1 at 105 and 110. In one embodiment, the user's account may be credited by updating the User table group 1319*a*. In one implementation, the User table group 1319*a* may be updated using a SQL statement (e.g. UPDATE CurrencyTable SET VCAmount=VCAmount+'virtual currency amount determined at 110' WHERE user_UID='UID of the user' AND VCType='virtual currency type determined at 105').

A determination may be made at 1110 whether the acquired virtual currency type has special persistent properties associated with it (e.g., it is a special virtual currency). For example, a special virtual currency type may have dynamic history associated with it (e.g., a Royalé poker chip may carry a history of the people who have lost the chip prior to the current owner gaining it). In another example, a special virtual currency type may have special benefits associated with it (e.g., special mana that allows the user to cast otherwise unavailable spells). In one embodiment, the determination at 1110 may be made based on data stored in the Currency table group 1319*f*. In one implementation, this information may be retrieved from the Currency table group 1319*f* using a SQL statement (e.g., SELECT SpecialVC FROM CurrencyTable WHERE VCT e='VC Type of acquired virtual currency'). In another embodiment, the determination may be made based on game logic rules.

If the acquired virtual currency is a special virtual currency, special persistent properties associated with the virtual currency may be updated at 1115. For example, the history associated with a Royalé poker chip may be updated to reflect that the user won the Royalé poker chip. In another example, the amount of special mana associated with a virtual currency piece may be updated according to game rules (e.g., the virtual currency piece starts out with 10 mana upon winning from another player, and increases by 1 mana each time the virtual currency piece is used in battle). In one embodiment, the special persistent properties associated with the virtual currency may be updated by updating the User table group 1319*a* (e.g., using one or more SQL statements).

At 1120, the user account modifying component may determine whether the acquired virtual currency allows the user to level up or to access new upgrades, abilities, good, areas, and/or the like. For example, the user may have to acquire a predetermined (e.g., based on in-game rules) amount of premium virtual currency (e.g., credit virtual currency, special virtual currency, and/or the like) to progress to the next user in-game level (e.g., progress from level 99 to level 100 in Zynga Game Network's Mafia Wars game). In another example, the user may have to acquire one or more premium virtual currency pieces to gain access to new upgrades (e.g., a special virtual currency piece that allows the user to upgrade properties in Cuba in Zynga Game Network's Mafia Wars game beyond level 30), new abilities (e.g., a special Royalé poker chip that grants ability for a friend of the user who is not playing, but who is in the user's social graph, to see the user's cards and the cards dealt to provide advice in Zynga Poker game), new goods (e.g., 100 Lucky Horseshoes to buy a Tree House in Zynga Game Network's FrontierVille game), new areas (e.g., 10 Las Vegas Chips to access Las Vegas area in Zynga Game Network's Mafia Wars game), new perks (e.g., purchase 100 Reward Points to become a Gold Player and get access to Gold Level rewards). In one embodiment, the user's in-game level may be increased based on the determination that the user acquired premium virtual currency. In one embodiment, the user may be granted access to new upgrades, abilities, good, areas, perks and/or the like. In one implementation, the user interface may be modified to facilitate access (e.g., a button to purchase an upgrade may be changed from being "non-clickable" to being "clickable"). In another implementation, the user may be prompted to facilitate a purchase (e.g., a pop up dialog presenting the user with an opportunity to purchase an item).

The user's leader board information associated with the acquired virtual currency may be updated at 1130. For example, a leader board (e.g., a ranked display of player status that is visible within a game or within the infrastructure of the game operator to the player and/or to other players) associated with the acquired virtual currency type may be updated to reflect the new amount of the acquired virtual currency type owned by the user. In one implementation, a leader board may display information regarding the various virtual currency types tracked by the leader board. In another implementation, multiple leader boards may exist for different virtual currency types. In one embodiment, the leader board associated with the acquired virtual currency type may be updated upon execution of the transaction (e.g., whenever a player gains new virtual currency), periodically (e.g., every 5 minutes), and/or the like. In another embodiment, the leader board associated with the acquired virtual currency type may be updated when viewed by a user. In one embodiment, a leader board associated with a virtual currency type may be updated (e.g., using one or more SQL statements, PHP statements, and/or the like) to indicate the ranking of players with respect to amounts of the virtual currency type owned by each player (e.g., a player with the largest amount of the virtual currency type may be ranked first, a player with the second largest amount of the virtual currency type may be ranked second, etc.).

Figure 12:
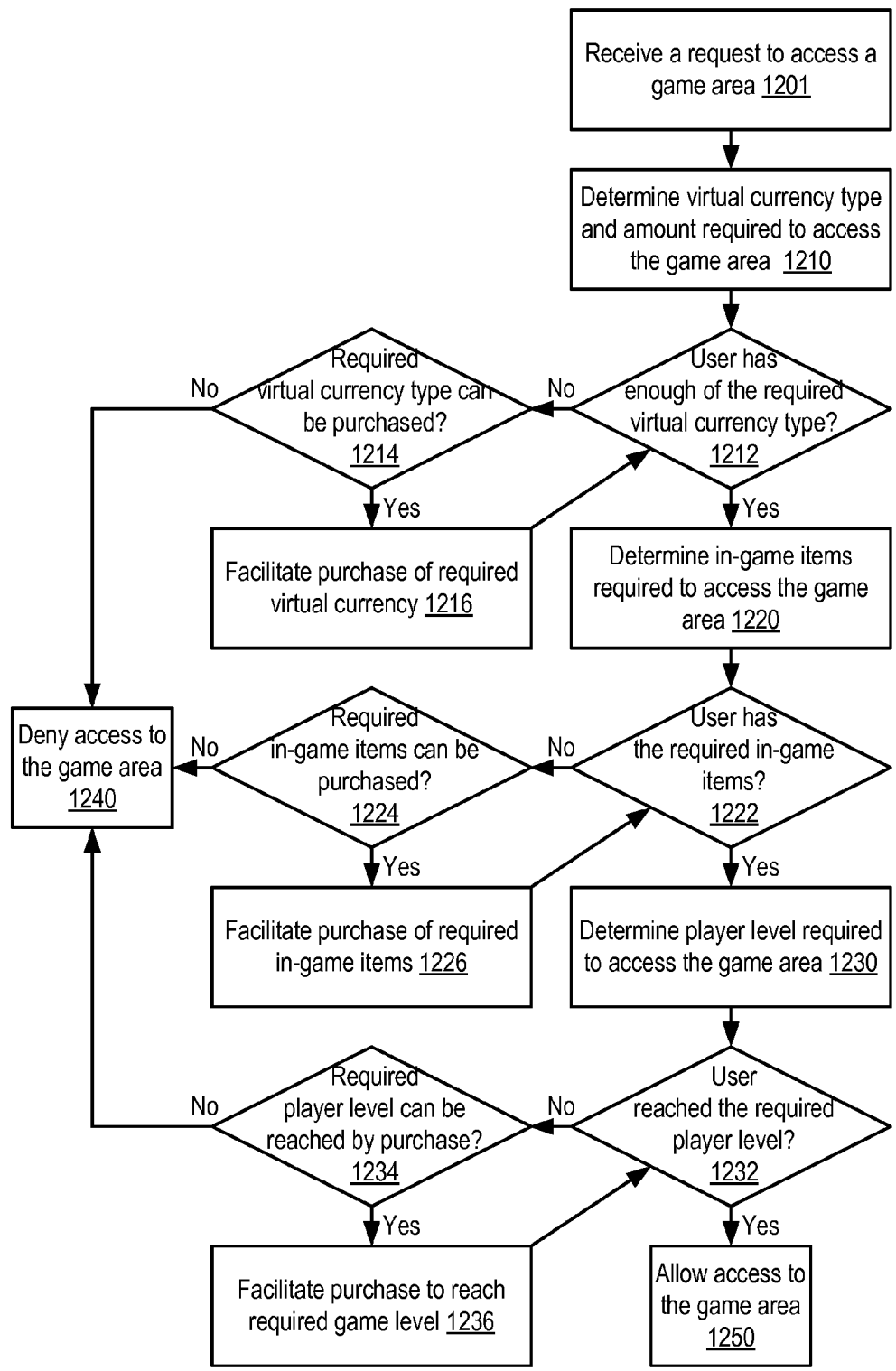
FIG. 12 is of a logic flow diagram illustrating game area access determination in one embodiment of the MIC platform.

FIG. 12 is of a logic flow diagram illustrating game area access determination in one embodiment of the MIC platform. In one embodiment, a game area may include areas, items, upgrades, abilities, perks and/or the like. In FIG. 12 a request to access a game area may be received at 1201. For example, a user may wish to access Las Vegas area in Zynga Game Network's Mafia Wars game. In one embodiment, access request details may be included in an access request details data structure included as part of the request. For example, the access request details data structure may be passed in as an argument to a function written in the PHP programming language (e.g., the access request details data structure may include a variety of fields such as the unique ID (UID) of a user associated with the request, UID of a game area to be accessed, and/or the like). In one implementation, access request details may be retrieved from the access request details data structure using PHP (e.g., $UserUID=$accessRequestDetails["UserUID"]; $GameAreaUID=$ accessRequestDetails ["GameAreaUID"];).

In one embodiment, the user may have to possess a predetermined (e.g., based on in-game rules) amount of a virtual currency type (e.g., ordinary virtual currency, premium virtual currency, and/or the like) to access the game area, which may be determined at 1210. For example, the user may have to possess 10 Las Vegas Chips to access Las Vegas area in Zynga Game Network's Mafia Wars game. In another example, the user may have to possess 100,000 New York Dollars to purchase an Automatic Rifle in Zynga Game Network's Mafia Wars game. In one implementation, information regarding virtual currency type and amount the user may have to possess to access the game area may be retrieved from the In-Game Data table group 1319c using a SQL statement (e.g., SELECT VCType, VCAmount FROM GameAreasAccess WHERE GameAreaUID='UID for a game area from the access request details data structure'). A determination may be made whether the user has enough of the required virtual currency type to access the game area at 1212. In one implementation, the user's current currency amount may be retrieved from the User table group 1319a using a SQL statement (e.g., SELECT VCAmount FROM UserCurrencyTable WHERE user_UID='User's UID' AND VCType='VC Type required') and compared to the information determined at 1210. If the determination at 1212 indicates that the user does not have enough virtual currency to access the game area, a determination may be made at 1214 whether the virtual currency type may be purchased. In one implementation, this determination may be made based on information stored in the Currency table group 1319f and retrieved using a SQL statement (e.g., SELECT CanBePurchased FROM Currencies WHERE VCT e='VC Type required'). In another implementation, this determination may be made based on game logic rules (e.g., Las Vegas Chips may not be purchased). If the determination at 1214 indicates that the virtual currency may be purchased, purchase of the required virtual currency may be facilitated at 1216. For example, a pop up window may be displayed to the user presenting the user with an opportunity to purchase the required virtual currency.

In one embodiment, the user may have to possess predetermined (e.g., based on in-game rules) items to access the game area, which may be determined at 1220. For example, the user may have to possess one or more Untraceable Cell Phones to perform a New York job in Zynga Game Network's Mafia Wars game. In another example, the user may have to possess a variety of items to upgrade a Weapons Depot property in Zynga Game Network's Mafia Wars game. In one implementation, information regarding items the user may have to possess to access the game area may be retrieved from the In-Game Data table group 1319c using a SQL statement (e.g., SELECT ItemsList FROM GameAreasAccess WHERE GameAreaUID='UID for a game area'). A determination may be made whether the user has the items required to access the game area at 1222. In one implementation, the user's items may be retrieved from the User table group 1319a using a SQL statement (e.g., SELECT COUNT(ItemUID) FROM UserItemsTable WHERE user_UID='User's UID' AND ItemUID='UID of the required item') and compared to the information determined at 1220. If the determination at 1222 indicates that the user does not have the items to access the game area, a determination may be made at 1224 whether a required item may be purchased. In one implementation, this determination may be made based on information stored in the In-Game Data table group 1319c and retrieved using a SQL statement (e.g., SELECT CanBePurchased FROM Items WHERE ItemUID='UID of the required item'). In another implementation, this determination may be made based on game logic rules (e.g., the item may be purchased with Reward Points). If the determination at 1224 indicates that the item may be purchased, purchase of the required item may be facilitated at 1226. For example, a pop up window may be displayed to the user presenting the user with an opportunity to purchase the required item. In another example, a pop up window may be displayed to the user presenting the user with an opportunity to purchase virtual currency (e.g. credit virtual currency) that may be used to purchase the required item.

In one embodiment, the user may have to reach a predetermined (e.g., based on in-game rules) in-game level to access the game area, which may be determined at 1230. For example, the user may have to reach level 35 to access Cuba area in Zynga Game Network's Mafia Wars game. In another example, the user may have to reach level 10 in Zynga Game Network's Mafia Wars game and level 4 in Zynga Game Network's FarmVille game to gain access to a special weapon in Zynga Game Network's Mafia Wars game. In one implementation, information regarding an in-game level the user may have to reach to access the game area may be retrieved from the In Game Data table group 1319c using a SQL statement (e.g., SELECT PlayerLevel FROM GameAreasAccess WHERE GameAreaUID='UID for a game area'). A determination may be made whether the user has reached the in-game level required to access the game area at 1232. In one implementation, the user's in-game level may be retrieved from the User table group 1319a using a SQL statement (e.g., SELECT UserLevel FROM Users WHERE user_UID='User's UID') and compared to the information determined at 1230. If the determination at 1232 indicates that the user has not reached the in-game level to access the game area, a determination may be made at 1234 whether the required in-game level may be reached with a purchase. In one implementation, this determination may be made based on information stored in the In-Game Data table group 1319c and retrieved using a SQL statement (e.g., SELECT CanBePurchased FROM Levels WHERE LevelUID='UID of the required level'). In another implementation, this determination may be made based on game logic rules (e.g., a level may be reached by paying level number (e.g., 5) times 10 Reward Points—level 5*10=50 Reward Points). If the determination at 1234 indicates that the in-game level may be reached with a purchase, such a purchase may be facilitated at 1236. For example, a pop up window may be displayed to the user presenting the user with an opportunity to pay Reward Points to reach the required in-game level. In another example, a pop up window may be displayed to the user presenting the user with an opportunity to purchase virtual currency (e.g. credit virtual currency) that may be used to reach the required in-game level.

If a determination at 1214, 1224, or 1234 is negative, the user may be denied access to the requested game area at 1240. Otherwise, the user may be granted access to the requested game area at 1250.

MIC Controller

Figure 13:
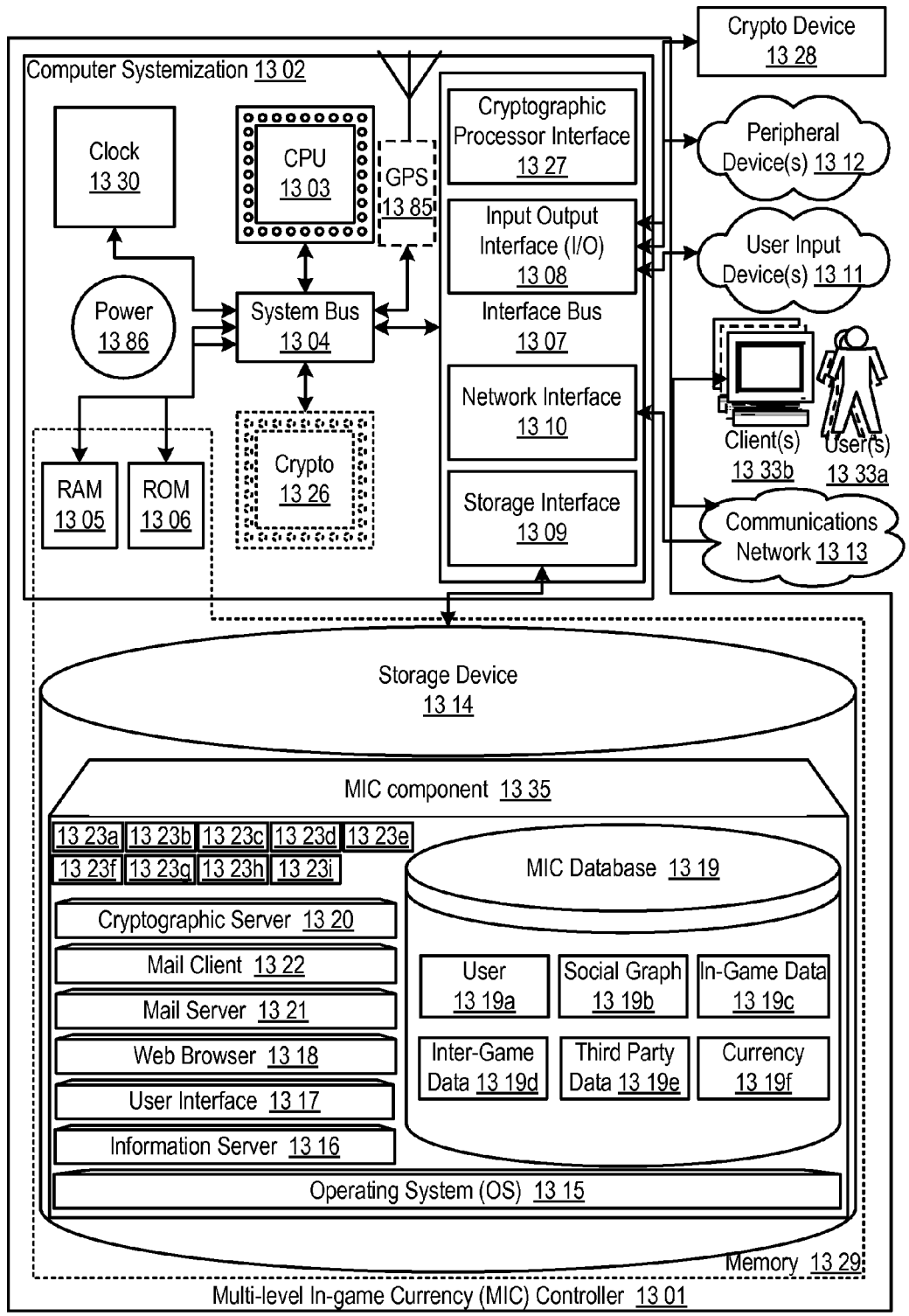
FIG. 13 is of a block diagram illustrating embodiments of the MIC platform controller.

FIG. 13 illustrates inventive aspects of a MIC controller 1301 in a block diagram. In this embodiment, the MIC controller 1301 may serve to aggregate, process, store, search, serve, identify, instruct, generate, match, and/or facilitate interactions with a computer through a variety of information technologies, and/or other related data.

Typically, users, which may be people and/or other systems, may engage information technology systems (e.g., computers) to facilitate information processing. In turn, computers employ processors to process information; such processors 1303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MIC controller 1301 may be connected to and/or communicate with entities such as, but not limited to: one or more users from user input devices 1311; peripheral devices 1312; an optional cryptographic processor device 1328; and/or a communications network 1313.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MIC controller 1301 may be based on computer systems that may comprise, but are not limited to, components such as: a computer systemization 1302 connected to memory 1329.

Computer Systemization

A computer systemization 1302 may comprise a clock 1330, central processing unit ("CPU(s)" and/or "processor(s)" (these terms are used interchangeable throughout the disclosure unless noted to the contrary)) 1303, a memory 1329 (e.g., a read only memory (ROM) 1306, a random access memory (RAM) 1305, etc.), and/or an interface bus 1307, and most frequently, although not necessarily, are all interconnected and/or communicating through a system bus 1304 on one or more (mother)board(s) 1302 having conductive and/or otherwise transportive circuit pathways through which instructions (e.g., binary encoded signals) may travel to effect communications, operations, storage, etc. Optionally, the computer systemization may be connected to an internal power source 1386. Optionally, a cryptographic processor 1326 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the MIC controller and beyond through various interfaces. Should processing requirements dictate a greater amount speed and/or capacity, distributed processors (e.g., Distributed MIC), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the MIC may be achieved by implementing a microcontroller such as CAST's R8051XC2 microcontroller; Intel's MCS 51 (i.e., 8051 microcontroller); and/or the like. Also, to implement certain features of the MIC, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MIC component collection (distributed or otherwise) and/or features may be implemented via the microprocessor and/or via embedded components; e.g., via ASIC, coprocessor, DSP, FPGA, and/or the like. Alternately, some implementations of the MIC may be implemented with embedded components that are configured and used to achieve a variety of features or signal processing.

Depending on the particular implementation, the embedded components may include software solutions, hardware solutions, and/or some combination of both hardware/software solutions. For example, MIC features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx Logic blocks and interconnects can be programmed by the customer or designer, after the FPGA is manufactured, to implement any of the MIC features. A hierarchy of programmable interconnects allow logic blocks to be interconnected as needed by the MIC system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the MIC may be developed on regular FPGAs and then migrated into a fixed version that more resembles ASIC implementations. Alternate or coordinating implementations may migrate MIC controller features to a final ASIC instead of or in addition to FPGAs. Depending on the implementation all of the aforementioned embedded components and microprocessors may be considered the "CPU" and/or "processor" for the MIC.

Power Source

The power source 1386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1386 is connected to at least one of the interconnected subsequent components of the MIC thereby providing an electric current to all subsequent components. In one example, the power source 1386 is connected to the system bus component 1304. In an alternative embodiment, an outside power source 1386 is provided through a connection across the I/O 1308 interface. For example, a USB and/or IEEE 1394 connection carries both data and power across the connection and is therefore a suitable source of power.

Interface Adapters

Interface bus(ses) 1307 may accept, connect, and/or communicate to a number of interface adapters, conventionally although not necessarily in the form of adapter cards, such as but not limited to: input output interfaces (I/O) 1308, storage interfaces 1309, network interfaces 1310, and/or the like. Optionally, cryptographic processor interfaces 1327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1309 may accept, communicate, and/or connect to a number of storage devices such as, but not limited to: storage devices 1314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1310 may accept, communicate, and/or connect to a communications network 1313. Through a communications network 1313, the MIC controller is accessible through remote clients 1333b (e.g., computers with web browsers) by users 1333a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed MIC), architectures may similarly be employed to pool, load balance, and/or otherwise increase the communicative bandwidth required by the MIC controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1310 may be used to engage with various communications network types 1313. For example, multiple network interfaces may be employed to allow for the communication over broadcast, multicast, and/or unicast networks.

Input Output interfaces (I/O) 1308 may accept, communicate, and/or connect to user input devices 1311, peripheral devices 1312, cryptographic processor devices 1328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1311 may be card readers, dongles, finger print readers, gloves, graphics tablets, joysticks, keyboards, mouse (mice), remote controls, retina readers, trackballs, trackpads, and/or the like.

Peripheral devices 1312 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the MIC controller may be embodied as an embedded, dedicated, and/or monitor-less (i.e., headless) device, wherein access would be provided over a network interface connection.

Cryptographic units such as, but not limited to, microcontrollers, processors 1326, interfaces 1327, and/or devices 1328 may be attached, and/or communicate with the MIC controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1329. However, memory is a fungible technology and resource, thus, any number of memory embodiments may be employed in lieu of or in concert with one another. It is to be understood that the MIC controller and/or a computer systemization may employ various forms of memory 1329. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1329 will include ROM 1306, RAM 1305, and a storage device 1314. A storage device 1314 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1329 may contain a collection of program and/or database components and/or data such as, but not limited to: operating system component(s) 1315 (operating system); information server component(s) 1316 (information server); user interface component(s) 1317 (user interface); Web browser component(s) 1318 (Web browser); database(s) 1319; mail server component(s) 1321; mail client component(s) 1322; cryptographic server component(s) 1320 (cryptographic server); the MIC component(s) 1335; and/or the like (i.e., collectively a component collection). These components may be stored and accessed from the storage devices and/or from storage devices accessible through an interface bus. Although non-conventional program components such as those in the component collection, typically, are stored in a local storage device 1314, they may also be loaded and/or stored in memory such as: peripheral devices, RAM, remote storage facilities through a communications network, ROM, various forms of memory, and/or the like.

Operating System

The operating system component 1315 is an executable program component facilitating the operation of the MIC controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MIC controller to communicate with other entities through a communications network 1313. Various communication protocols may be used by the MIC controller as a subcarrier transport mechanism for interaction, such as, but not limited to: multicast, TCP/IP, UDP, unicast, and/or the like.

Information Server

An information server component 1316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MIC controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MIC database 1319, operating systems, other program components, user interfaces, Web browsers, and/or the like.

Access to the MIC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MIC. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MIC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1318 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the MIC enabled nodes. The combined application may be nugatory on systems employing standard Web browsers.

Mail Server

A mail server component 1321 is a stored program component that is executed by a CPU 1303. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MIC.

Access to the MIC mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1322 is a stored program component that is executed by a CPU 1303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1320 is a stored program component that is executed by a CPU 1303, cryptographic processor 1326, cryptographic processor interface 1327, cryptographic processor device 1328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the MIC may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the MIC component to engage in secure transactions if so desired. The cryptographic component facilitates the secure accessing of resources on the MIC and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MIC Database

The MIC database component 1319 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the MIC database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the MIC database is implemented as a data-structure, the use of the MIC database 1319 may be integrated into another component such as the MIC component 1335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1319 includes several table groups 1319a-f comprising of one or more tables in various implementations. A User table group 1319a includes fields such as, but not limited to: a user_UID, VCType, VCAmount, and/or the like. The User table group may support and/or track multiple entity accounts on a MIC. A Social Graph table group 1319b includes fields such as, but not limited to: a user_UID, FriendsCount, and/or the like. The Social Graph table group may support and/or track social graph data on a MIC. An In-Game Data table group 1319c includes fields such as, but not limited to: a user_UID, VCAwardTime, VCAwardAmount, and/or the like. The In-Game Data table group may support and/or track in-game data on a MIC. An Inter-Game Data table group 1319d includes fields such as, but not limited to: a user_UID, GamesPlayingList, and/or the like. The Inter Game Data table group may support and/or track inter-game data on a MIC. A Third Party table group 1319e includes fields such as, but not limited to: an incentive_UID, IncentiveLink, and/or the like. The Third Party Data table group may support and/or track third party incentives on a MIC. A Currency table group 1319f includes fields such as, but not limited to: a VCType, ConversionRate, and/or the like. The Currency table group may support and/or track multiple currency types on a MIC.

In one embodiment, the MIC database may interact with other database systems. For example, employing a distributed database system, queries and data access by search MIC component may treat the combination of the MIC database, an integrated data security layer database as a single database entity.

In one embodiment, user programs may contain various user interface primitives, which may serve to update the MIC. Also, various accounts may require custom database tables depending upon the environments and the types of clients the MIC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1319a-f. The MIC may be configured to keep track of various settings, inputs, and parameters via database controllers.

The MIC database may communicate to and/or with other components in a component collection, including itself, and/or facilities of the like. Most frequently, the MIC database communicates with the MIC component, other program components, and/or the like. The database may contain, retain, and provide information regarding other nodes and data.

The MICs

The MIC component 1335 is a stored program component that is executed by a CPU. In one embodiment, the MIC component incorporates any and/or all combinations of the aspects of the MIC that was discussed in the previous figures. As such, the MIC affects accessing, obtaining and the provision of information, services, transactions, and/or the like across various communications networks.

The MIC component may transform user transaction request input via various MIC components into transaction result output, and/or the like and enables use of the MIC. In one embodiment, the MIC component 1335 takes inputs (e.g., user transaction request 220, and/or the like), and transforms the inputs via various components (e.g., AED 1323a, ICF 1323b, TPIM 1323c, PED 1323d, VCCED 1323e, RCCED 1323f, CRD 1323g, TED 1323h, UAM 1323i, and/or the like), into outputs (e.g., transaction request 222, virtual currency, user, in-game, and inter-game data 224, request for social graph data 226, response with social graph data 228, request to confirm fulfillment of incentive conditions 230, confirmation response 232, payment information 234, virtual currency data 236, transaction response 238, transaction result output 240, and/or the like), as shown in the figures and throughout the specification.

The MIC component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the MIC server employs a cryptographic server to encrypt and decrypt communications. The MIC component may communicate to and/or with other components in a component collection, including itself, and/or facilities of the like. Most frequently, the MIC component communicates with the MIC database, operating systems, other program components, and/or the like. The MIC may contain, communicate, generate, obtain, and/or provide program component, system, user, and/or data communications, requests, and/or responses.

Distributed MICs

The structure and/or operation of any of the MIC node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MIC controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter application communication or within memory spaces of a singular component for intra application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse (e.g., communications) data Further, the parsing grammar may be used beyond message parsing, but may also be used to parse: databases, data collections, data stores, structured data, and/or the like. Again, the desired configuration will depend upon the context, environment, and requirements of system deployment. The following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for APPARATUSES, METHODS AND SYSTEMS FOR A MULTI-LEVEL IN GAME CURRENCY PLATFORM (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed invention(s) may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a MIC individual and/or enterprise user, database configuration and/or relational model, data type, data transmission and/or network framework, syntax structure, and/or the like, various embodiments of the MIC, may be implemented that enable a great deal of flexibility and customization. For example, aspects of the MIC may be adapted for non-game use. While various embodiments and discussions of the MIC have been directed to using multiple types of virtual currency in games, however, it is to be understood that the embodiments described herein may be readily configured and/or customized for a wide variety of other applications and/or implementations.

What is claimed is:

1. A method implemented by a processor for dynamic conversion of a transaction, the method comprising:

receiving a transaction request from a user, wherein the transaction request includes data related to a transaction and user characteristics of the user, the transaction request includes information for crediting an account of the user with a requested virtual currency;

analyzing data associated with the transaction and the user characteristics of the user to determine if the user is eligible to request the transaction;

when the user is eligible for requesting the transaction,
identifying a payment currency for the requested transaction;
computing a dynamic conversion rate for converting the payment currency to the requested virtual currency, the dynamic conversion rate being adjustable during game play based on the user characteristics of the user related to progression within the game play, the dynamic conversion rate including a game progression adjustment that is to be applied during conversion of the payment currency to the requested virtual currency, the game progression adjustment determined based on the user characteristics affecting the game play; and
calculating a purchase price in terms of the payment currency for the requested virtual currency of the transaction request using the dynamic conversion rate, the purchase price being used in completing the transaction request,
wherein any one or more operations of receiving, analyzing, identifying and computing are performed by the processor of a computer.

2. The method of claim 1, wherein analyzing data further includes,
retrieving data associated with the user, data related to the virtual currency and data related to the game play associated with the transaction request; and
analyzing the retrieved data to determine user eligibility for requesting the transaction.

3. The method of claim 1, wherein computing dynamic conversion rate includes,
identifying currency type of the payment currency;
determining currency type of the requested virtual currency;
verifying to see if the payment currency can be converted to the requested virtual currency based on the currency types of the payment currency and the requested virtual currency; and calculating dynamic conversion rate for the conversion from payment currency to the requested virtual currency upon successfully verifying the conversion can be implemented.

4. The method of claim 3, wherein computing dynamic conversion rate includes computing dynamic conversion rate for converting to one or more of a plurality of virtual currencies so as to enable conversion of the payment currency first to one or more of the plurality of virtual currencies and from any one or more of the plurality of virtual currencies to the requested virtual currency, wherein computing of dynamic conversion rates for converting the payment currency to the one or more of the plurality of virtual currencies is after successful verification that the payment currency can be converted to the one or more of the plurality of virtual currencies and wherein the purchase price for the requested virtual currency is calculated using the dynamic conversion rate of the one or more of the plurality of virtual currencies.

5. The method of claim 3, wherein the currency type of the payment currency is one of real currency or a type of virtual currency that is different from the requested virtual currency and wherein the currency type of the requested virtual currency is one of an ordinary virtual currency or a special virtual currency.

6. The method of claim 3, wherein computing the dynamic conversion rate further includes, retrieving a base conversion rate for converting between the payment currency and the requested virtual currency based on the currency type of the payment currency and the requested virtual currency;

calculating, via a processor, a game progression adjustment to the base conversion rate based on the identified user characteristics affecting the game play; and calculating, via a processor, the dynamic conversion rate by adjusting the base conversion rate with the game progression adjustment.

7. The method of claim 6, wherein the game progression adjustment is dynamically adjusted during the game play based on the dynamic progression of the plurality of users through the game.

8. The method of claim 6, wherein computing dynamic conversion rate further includes, determining conversion channel used by the user for the transaction request;

retrieving a conversion rate associated with the conversion channel;

calculating a conversion channel adjustment to the base conversion rate using the conversion rate associated with the conversion channel; and aggregating the conversion channel adjustment and the game progression adjustment to derive an aggregated adjustment, wherein the aggregated adjustment is applied to the base conversion rate during calculation of the dynamic conversion rate.

9. The method of claim 8, wherein the conversion rates associated with the conversion channel is determined by game logic rules.

10. A computer-implemented method for dynamic conversion of a transaction implemented by a processor, the method comprising:

receiving a request from a user to convert a payment currency of a first type to a requested currency of a second type, wherein the request includes data related to a transaction and user characteristics associated with the user, the request is for crediting a user's account with the requested currency, wherein the payment currency is a reward or transfer;

verifying to see if the user is eligible to receive the payment currency as a reward or transfer, wherein the user eligibility is based on type of transaction and predetermined logic rules;

analyzing data associated with the transaction and the user characteristics of the user to determine if the payment currency can be converted to requested currency and if the user is eligible to request conversion of the payment currency to the requested currency;

computing a dynamic conversion rate for converting the payment currency to the requested currency based on the analysis, the dynamic conversion rate being adjustable during game play based on the user characteristics of the user related to progression within the game play, the dynamic conversion rate including a game progression adjustment that is to be applied during conversion of the payment currency to the requested currency, the game progression adjustment determined based on the user's user characteristics affecting the game play; and calculating a purchase price for the requested currency associated with the request using the computed dynamic conversion rate, wherein any one or more operations of receiving, verifying, analyzing and computing are performed by a processor of a computer.

11. The method of claim 10, wherein the currency of the first type comprises any one of a credit virtual currency, virtual currency of the second type or real currency, the payment currency obtained as reward is periodically awarded upon fulfilling an incentive or upon occurrence of an event, the incentive being one of an in-game incentive, inter-game incentive or a third party incentive, wherein the transfer is one of gift or game winning.

12. The method of claim 10, wherein the analyzing data further includes, obtaining in-game data, social graph data and other data associated with the user; and determining eligibility of the user to convert the payment currency to the requested currency based on user characteristics of the user captured in the in-game data, social graph data and other data.

13. The method of claim 10, wherein computing dynamic conversion rate includes, identifying currency type of the payment currency;

determining currency type of the requested currency;

verifying to see if the payment currency can be converted to the requested currency based on the currency types of the payment currency and the requested currency; and computing dynamic conversion rate for the conversion from the payment currency to the requested currency upon successfully verifying the conversion can be implemented.

14. The method of claim 13, wherein the currency type of the payment currency is one of real currency or a type of virtual currency that is different from the requested currency and wherein the currency type of the requested currency is one of an ordinary virtual currency or a special virtual currency.

15. The method of claim 13, wherein computing dynamic conversion rate further includes, retrieving, via a processor, a base conversion rate for converting between the payment currency and the requested currency based on the currency type of the payment currency and the requested currency;

calculating, via a processor, a game progression adjustment to the base conversion rate based on the user characteristics affecting the game play; and calculating, via a processor, the dynamic conversion rate by adjusting the base conversion rate with the game progression adjustment.

16. A processor-readable non-transitory storage medium storing instructions which when executed by the processor performs dynamic conversion of a transaction, the storage medium having instructions to:

receive a transaction request from a user, wherein the transaction request includes data related to a transaction and user characteristics of the user, the transaction request includes information for crediting an account of the user with a requested virtual currency;

analyze data associated with the transaction and the user to determine if the user is eligible to request the transaction;

when the user is eligible for requesting the transaction,
identify a payment currency for the requested transaction;

compute dynamic conversion rate for converting the payment currency to the requested virtual currency, the dynamic conversion rate being adjustable during game play based on the user characteristics of the user related to progression within the game play, the dynamic conversion rate including a game progression adjustment that is to be applied during conversion of the payment currency to the requested virtual currency, the game progression adjustment determined based on the user's user characteristics affecting the game play; and calculate a purchase price in terms of the payment currency for the requested virtual currency of the transaction request using the dynamic conversion rate, the purchase price used in completing the transaction request.

17. The storage medium of claim 16, wherein instructions to compute dynamic conversion rate includes instructions to,
identify currency type of the payment currency;
determine currency type of the requested virtual currency;
verify to see if the payment currency can be converted to the requested virtual currency based on the currency types of the payment currency and the requested virtual currency; and calculate dynamic conversion rate for the conversion from payment currency to the requested virtual currency upon successfully verifying the conversion can be implemented.

18. The storage medium of claim 16, wherein instructions to compute dynamic conversion rate includes instructions to,
compute dynamic conversion rate for converting to one or more of a plurality of virtual currencies so as to enable conversion of the payment currency first to one or more of the plurality of virtual currencies and from any one or more of the plurality of virtual currencies to the requested virtual currency, wherein computing of the dynamic conversion rates for converting the payment currency to the one or more of the plurality of virtual currencies is after successful verification that the payment currency can be converted to the corresponding one or more of the plurality of virtual currencies and wherein the purchase price for the requested virtual currency is calculated using the dynamic conversion rate of the one or more of the plurality of virtual currencies.

19. The storage medium of claim 17, wherein the currency type of the payment currency is one of real currency or a type of virtual currency that is different from the requested virtual currency and wherein the currency type of the requested virtual currency is one of an ordinary virtual currency or a special virtual currency.

20. The storage medium of claim 17, wherein instructions to compute the dynamic conversion rate includes instructions to, retrieve a base conversion rate for converting between the payment currency and the requested virtual currency based on the currency types of the payment currency and the requested virtual currency;

calculate a game progression adjustment to the base conversion rate based on the user characteristics affecting the game play; and calculate the dynamic conversion rate by adjusting the base conversion rate with the game progression adjustment.

* * * * *